United States Patent
Luo et al.

(10) Patent No.: US 9,622,188 B2
(45) Date of Patent: Apr. 11, 2017

(54) INTER-CELL POWER CONTROL IN THE PRESENCE OF FRACTIONAL FREQUENCY REUSE

(71) Applicant: QUALCOMM Incorporated, San Diego, CA (US)

(72) Inventors: Xiliang Luo, San Diego, CA (US); Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/302,020

(22) Filed: Jun. 11, 2014

(65) Prior Publication Data

US 2014/0295907 A1  Oct. 2, 2014

Related U.S. Application Data

(62) Division of application No. 12/443,780, filed on Jun. 10, 2009, now Pat. No. 8,712,424.
(Continued)

(51) Int. Cl.
*H04W 72/00* (2009.01)
*H04W 52/24* (2009.01)
(Continued)

(52) U.S. Cl.
CPC ........... *H04W 52/24* (2013.01); *H04W 16/02* (2013.01); *H04W 24/02* (2013.01);
(Continued)

(58) Field of Classification Search
USPC .................. 455/453, 522, 450, 452.2, 67.13
See application file for complete search history.

(56) References Cited

U.S. PATENT DOCUMENTS 6,459,902 B1  10/2002 Li et al.
7,069,037 B2   6/2006 Lott et al.
(Continued)

FOREIGN PATENT DOCUMENTS

CN  1669186 A  9/2005
JP  2000503492 A  3/2000
(Continued)

OTHER PUBLICATIONS

European Search Report—EP12196290—Search Authority—Munich—May 23, 2013.
(Continued)

*Primary Examiner* — Lester Kincaid
*Assistant Examiner* — Sayed T Zewari
(74) *Attorney, Agent, or Firm* — Charles Chesney

(57) ABSTRACT

System(s) and method(s) are provided for inter-cell power control in the presence of fractional frequency reuse in a wireless communication system. Transmission power control of a terminal, and ensuing inter-cell interference mitigation, is accomplished by receiving load indicators from non-serving sectors, decoding those load indicators corresponding to the non-serving sectors that operate in the same frequency bands as the terminal, and adjusting the transmission power according the states of the decoded load indicators in conjunction with the associated non-serving sectors' forward link signal-to-interference-and-noise ratio at the terminal. The states of the load indicators reflect magnitudes of interference metrics with respect to threshold values. Load indicators can also be conveyed by the non-serving sector to a base station serving the terminal through a backhaul communication, and said base station can schedule an adjusted transmission power for the terminal.

23 Claims, 16 Drawing Sheets

Related U.S. Application Data

(60) Provisional application No. 60/863,792, filed on Oct. 31, 2006.

(51) Int. Cl.
*H04W 16/02* (2009.01)
*H04W 24/02* (2009.01)
*H04W 52/14* (2009.01)
*H04W 52/22* (2009.01)
*H04W 52/34* (2009.01)

(52) U.S. Cl.
CPC ....... *H04W 52/241* (2013.01); *H04W 52/247* (2013.01); *H04W 52/146* (2013.01); *H04W 52/225* (2013.01); *H04W 52/343* (2013.01)

(56) References Cited

U.S. PATENT DOCUMENTS

| | | | |
|---|---|---|---|
| 7,230,942 | B2 | 6/2007 | Laroia et al. |
| 7,437,176 | B1 | 10/2008 | Ribas et al. |
| 7,764,705 | B2 | 7/2010 | Tiirola et al. |
| 2005/0096061 | A1 | 5/2005 | Ji et al. |
| 2006/0014542 | A1 | 1/2006 | Khandekar et al. |
| 2006/0019694 | A1 | 1/2006 | Sutivong et al. |
| 2006/0209721 | A1 | 9/2006 | Mese et al. |
| 2006/0234752 | A1* | 10/2006 | Mese ............... H04L 1/201 455/522 |
| 2007/0081449 | A1* | 4/2007 | Khan ............... H04W 16/06 370/208 |
| 2007/0142067 | A1 | 6/2007 | Cheng et al. |
| 2010/0105406 | A1 | 4/2010 | Luo et al. |

FOREIGN PATENT DOCUMENTS

| | | |
|---|---|---|
| JP | 2004260467 A | 9/2004 |
| JP | 2007507975 A | 3/2007 |
| RU | 2002108715 | 10/2003 |
| WO | WO-9726767 A1 | 7/1997 |
| WO | WO-0119124 | 3/2001 |
| WO | WO-2004093343 | 10/2004 |
| WO | WO-2005043780 A1 | 5/2005 |
| WO | WO-2005046283 A1 | 5/2005 |
| WO | WO-2006007318 A1 | 1/2006 |
| WO | WO-2006099547 A1 | 9/2006 |

OTHER PUBLICATIONS

International Premininary Report on Patent Ability—PCT/US07/082937, The International Bureau of WIPO, Geneva Switzerland—May 5, 2009.
International Search Report—PCT/US07/082937, International Search Authority—European Patent Office—May 23, 2008.
Samsung: "Flexible Fractional Frequency—Reuse Approach" R1-051341, Internet Citation Nov. 7, 2005 (Nov. 7, 2005), XP002387571 Retrieved from the Internet: URL:http://www.3gpp.org/ftp/tsgran/WGURL I/TSGRI_43/Docs/> [retrieved on 2006-06-273H: the whole document.
Taiwan Search Report—TW096141072—TIPO—Feb. 27, 2012.
Translation of Office Action in Russian application 2009120510 corresponding to U.S. Appl. No. 12/443,780, citing WO2006099547, RU2002108715, WO2006007318 and WO2004093343 dated Jan. 24, 2011.
Written Opinion—PCT/US07/082937, International Search Authority—European Patent Office—May 23, 2008.

* cited by examiner

INTER-CELL POWER CONTROL IN THE PRESENCE OF FRACTIONAL FREQUENCY REUSE

CROSS-REFERENCE TO RELATED APPLICATION

The present application is a divisional application of U.S. patent application Ser. No. 12/443,780, filed on Oct. 30, 2007, entitled "INTER-CELL POWER CONTROL IN THE PRESENCE OF FRACTIONAL FREQUENCY REUSE" which claims the benefit of U.S. provisional application Ser. No. 60/863,792, filed on Oct. 31, 2006, entitled "INTER-CELL POWER CONTROL WITH FFR." The entireties of which are incorporated herein by reference.

BACKGROUND

I. Field

The following description relates generally to wireless communications, and more particularly to inter-cell power control in a wireless communication system.

II. Background

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Communication described above relies on bandwidth that is finite, which has prompted the utilization of various approaches to extend service to multiple terminals while maintaining acceptable levels of interference. One of such approaches is frequency reuse with reuse much smaller than 1, where a large number of neighboring cells employ disparate frequency bands for communication. However, to better exploit system bandwidth and increase, for example, peak data rate and capacity, fractional frequency reuse (FFR) has been employed, where a set of frequency bands can be assigned for operation of disparate neighboring cells/sectors. Therefore, there is a need to mitigate inter-cell interference and effect inter-cell power control in the presence of FFR in order to improve communication.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, a method for generating a load indicator in a wireless communication system is disclosed, the method comprising: monitoring an interference metric associated with interference originated in a wireless communication sector; determining a load indicator according to whether the interference metric exceeds a threshold; and conveying the load indicator.

In another aspect, the subject specification discloses an apparatus that operates in a wireless communication system, comprising: means for determining an interference metric associated with interference originated in a wireless communication sector; means for generating a load indicator associated with an interference metric in a time-frequency resource; means for receiving a set of load indicators; and means for scheduling a power density assignment.

In yet another aspect, it is disclosed a wireless communication device, comprising: at least one processor configured to monitor interference originated in a set of sectors, to broadcast a load indicator when an interference metric associated with the monitored interference exceeds a threshold, to convey a load indicator through a backhaul network communication, and to assign a transmission power based at least in part on the logic state of a received load indicator; and a memory coupled to the at least one processor.

A still further aspect is a computer program product, comprising a computer-readable medium comprising: code for causing at least one computer to monitor an interference metric associated with interference originated in a wireless communication sector; code for causing the at least one computer to determine a load indicator according to whether the interference metric exceeds a threshold; and code for causing the at least one computer to convey the load indicator.

Another aspect disclosed herein related to a method that facilitates power control in a wireless communication system, the method comprising: receiving a load indicator originated in a set of sectors; decoding the load indicator corresponding to a non-serving sector with a highest signal-to-interference-and-noise ratio that operates in frequency bands assigned to a mobile terminal; and adjusting the mobile terminal's transmission power according to a state of the decoded load indicator.

Yet another aspect discloses a wireless communication device, comprising: at least one processor configured to receive a load indicator originated in a set of sectors, to decode the load indicator corresponding to a non-serving sector with a highest signal-to-interference-and-noise ratio that shares a fractional frequency reuse pattern with a mobile terminal, and to decrease the mobile terminal's transmission power when a value of the decoded load indicator indicates an interference metric in the non-serving sector has exceeded a threshold; and a memory coupled to the at least one processor.

Is a yet further method, an apparatus that operates in a wireless communication environment is disclosed, the apparatus comprising: means for receiving a load indicator associated with the magnitude of an interference metric, the load indicator originated in a non-serving sector; means for decoding the load indicator corresponding to a non-serving sector with a highest signal-to-interference-and-noise ratio that operates in a fractional frequency reuse assigned to an access terminal; and means for adjusting the mobile terminal's transmission power spectral density according to a state of the decoded load indicator.

Still another aspect discloses a computer program product, comprising a computer-readable medium comprising: code for causing the at least one computer to decode the load indicator corresponding to a non-serving sector with a highest signal-to-interference-and-noise ratio that operates in frequency bands assigned to a mobile terminal, the frequency bands associated with a fractional frequency reuse pattern; and code for causing the at least one computer to adjust the mobile terminal's transmission power according to a value of the decoded load indicator.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
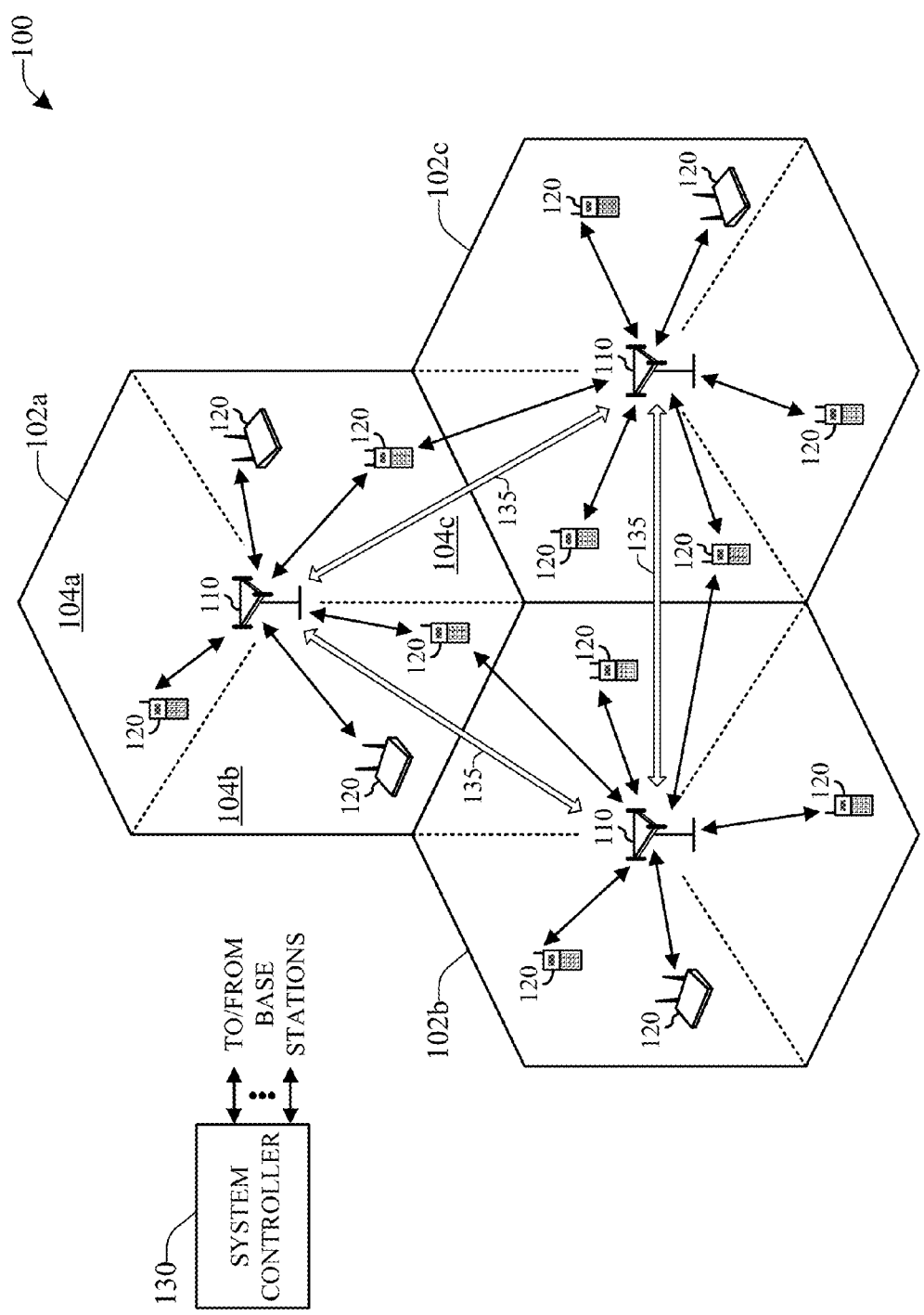
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. As further used herein, a "serving" access point is one with which a terminal has uplink traffic (data) transmissions, and a "neighbor" (non-serving) access point is one with which a terminal can have downlink traffic and/or both downlink and uplink control transmissions but no uplink traffic. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. Backhaul network communication 135 can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-EDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2:
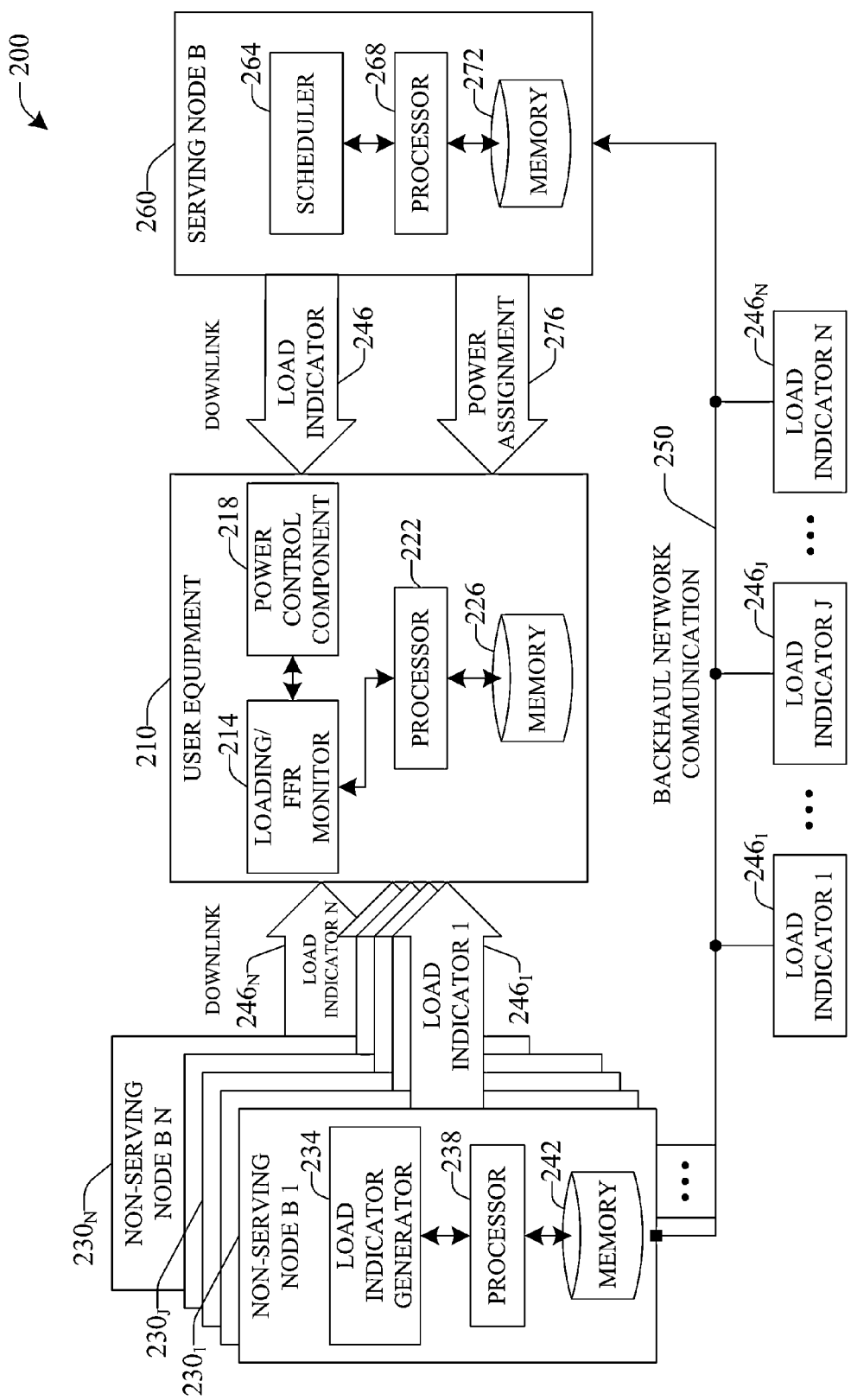
FIG. 2 is a block diagram of an example system that facilitates inter-cell power control in the presence of fractional frequency reuse.

FIG. 2 is a block diagram of a system 200 that facilitates inter-cell power control in the presence of fractional frequency reuse (FIR). User equipment 210 operates with fractional frequency reuse, the reuse pattern (or reuse table) is acquired during a synchronization process, or is received through the downlink from a serving Node B. Terminal 210 can receive downlink signals from a plurality of neighboring non-serving Node Bs $230_1$-$230_N$. Each of these base stations serves a neighboring sector (which can also be a service cell depending on sectorization characteristics). Depending on interference level in neighboring sectors, non-serving Node Bs $230_1$-$230_N$ can broadcast, respectively, a load indicator $246_1$-$246_N$. It should be appreciated that non-serving Node Bs $230_1$-$230_N$ can convey load indicators $246_1$-$246_N$ to serving Node B 260 through backhaul network communication 250. In contrast to a broadcast downlink communication over the air interface, such backhaul communication is a node-to-node transmission over the service provider network backbone. Broadcasted load indicators (e.g., $246_1$-$246_N$) are processed at user equipment 210 and transmission power of the terminal is adjusted so as to attain a desired level of interference at non-serving sectors. Backhaul communication 250 of load indicators (such as $246_1$-$246_N$) to the serving Node B 260, results in processing at said node, with ensuing relay of a load indicator 246 over the air interface or power (re)assignment 276 to terminal 210. Power reassignment 276 explicitly controls the power that user equipment 210 utilized to transmit. It is noted that node-to-node backhaul communication can also take place among non-serving base stations ($230_1$ to $230_N$). It is noted that in the subject description distinctions in functionality between non-serving Node Bs $230_1$-$230_N$ and serving Node B 260 are presented for the sake of explanation and clarity, and respective functionalities of serving and non-serving base stations are shared among said base stations. Generation of load indicators and processing thereof is discussed in greater detail below.

In a non-serving Node B (e.g., $230_J$), a load indicator generator component 234 determines an interference metric in the neighboring sector associated with the non-serving Node B. The interference metric is compared with a threshold (or tolerance) interference metric value $I_{TH}$, and a load indicator (e.g., load indicator $246_J$) is generated and transmitted over the air interface (downlink) or through the backhaul network (e.g., 250). In an aspect, a load indicator of value "true" is transmitted in cases the interference metric is above $I_{TH}$, otherwise a "false" indication is conveyed. It is noted that in systems that exploit fractional frequency reuse, disparate interference metric thresholds can be determined for disparate subbands based on the subband structure of the FFR patterns of serving and non-serving sectors (see below). It should be appreciated that several factors can determine $I_{TH}$, and these factors can typically be determined by a service provider: target peak data rate, target spectral efficiency, target latency, complexity and cost of base station/access point, etc. Interference can be measured in dB with respect to a reference value $I_{REF}$ which can be determined by, e.g., thermal noise in the system, and other sources of systematic noise.

The sector's interference metric can be an average interference over thermal noise (IoT), a signal-to-interference ratio, a signal-to-noise ratio (SNR), or a signal-to-noise-and-interference ratio (SINR). Such average can be determined over disparate frequency resources, e.g., subbands and subcarriers, and time resources such as frames and superframes. The level of granularity with respect to frequency-time resources of interference measurements, and ensuing interference averages, can be dictated by (a) intrinsic factors, such as time and frequency resolution of an instrument/electronics used to measure interference, or (b) extrinsic factors, e.g., dynamic reassignment of fractional frequency reuse pattern of a specific terminal (e.g., user equipment 210). It should be appreciated that FFR patterns for a sector/cell, and associated terminals operating on the sector/cell can be conveyed to non-serving neighboring base stations (e.g., $230_1$-$230_N$) via backhaul network communication. Processor 238, coupled to load indicator generator component 234, can conduct a portion of the computations necessary to establish the interference metric. A memory 242 can retain interference metric values, algorithms employed to determine such values, and other operational data/instructions relevant for determining the interference metric and load indicator.

As discussed above, UE 210 operates with fractional frequency reuse. In such a wireless communication deployment, available system bandwidth is divided in N frequency "chunks" and n of those chunks are available to terminal 210. Chunks typically correspond to a group of subbands (where each subband comprises a set of subcarriers). As disclosed hereinafter, mobile 210 can decode load indicators from non-serving sectors that have available the frequencies encompassed in the n chunks assigned to the mobile. Such frequency discrimination enhances power control with respect to conventional methods, as transmissions from a mobile (e.g., UE 210) interfere primarily with non-serving sectors operating in the same frequency subbands as those in which the mobile operates. It is noted that in idealized conditions, subcarriers in subbands are mutually orthogonal, and thus subcarriers of disparate frequencies do not interfere. In a typical scenario, orthogonality among subcarriers largely prevails and therefore the relevant indicators for interference management, and power control, are those transmitted in overlapping spectral regions for communication among terminals and non-serving sectors.

Loading/FFR monitor component 214 decodes the received load indicators, and determines whether such indicators are "true" or "false." (It should be appreciated that any other logic states indicating interference is above threshold are valid indicators, e.g., "above" or "below," "high" or "low," etc.) Instances in which the received load indicator (e.g., $246_N$) corresponding to the non-serving sector with the largest forward link SINR (a quantity that is available at terminal 210) is "true" leads power control component 218 to reduce the transmitting power or power spectral density. When a terminal receives a "false" load indicator, it increases its transmission power or power spectral density. It should be noted that decoding a binary state of a load indicator, which is typically conveyed with a single bit in a control channel, necessitates that a decoding mobile terminal (e.g., UE 210) is aware of the fractional frequency reuse pattern (or implantation) of neighboring non-serving sectors. Such FFR patterns can be (i) acquired by the mobile terminal at the time of sector/cell acquisition, or (ii) conveyed to the mobile by its serving node B (e.g., 260) upon such node has received the FFR patterns employed by neighboring non-serving sectors through backhaul network communication. It is noted that generally a nearest-neighbor non-serving FFR patterns are necessary due to the weakness of signals transmitted by second-nearest neighbor, and farther, non-serving sectors. The necessity of knowing multiple FFR patterns increases processing overhead; however, improved performance in power control and interference management offset such overhead (see below). In addition, such patterns can be stored in memory (e.g., 226) in the mobile. It is noted that when neighboring sectors' load indicators (e.g., $246_1$-$246_N$) are conveyed via backhaul communication (e.g., 250) and are processed at a serving base station (e.g., 260), a mobile terminal (e.g., 210) can dispense with the knowledge of scheduled FFR patterns if the terminal's transmission power is to be scheduled by the serving base station.

Regarding response to a "true" indicator, power reduction can take place in an open control loop, where power is decreased by an offset $\Delta P(I)$ that depends on the interference metric value I, or can be a predetermined constant $\Delta P(I)=\Delta P_0$, e.g., 0.25 dBm, and no feedback measurement of interference is requested by UE. Alternatively, the control loop can be closed by requesting feedback on interference after power reduction. It should be appreciated that there is a tradeoff between the overhead introduced by the control loop employed and the optimization of $\Delta P(I)$ to ensure effective interference mitigation below $I_{TH}$. Closed loop control can attain optimal levels of interference in a few control steps; however, each feedback step, which requires each sector that issued a "true" load indicator to measure interference after the power reduction step, can increase communication latency to levels that are inadequate for an application executed by terminal 210 (e.g., online gaming, videoconferencing, video broadcasting), or that are incompatible with QoS parameters established by the operator. On the other hand, an open control loop does not request measurements of interference, but such control can incur an excessive number of power reduction steps to attain a satisfactory level of interference, which can also result in latency-related degradation of communication.

Regarding power increase, fixed offset increments $\Delta P'$ can be suitable. To reduce complexity, $\Delta P'$ can equal $\Delta P_0$.

Figure 3A:
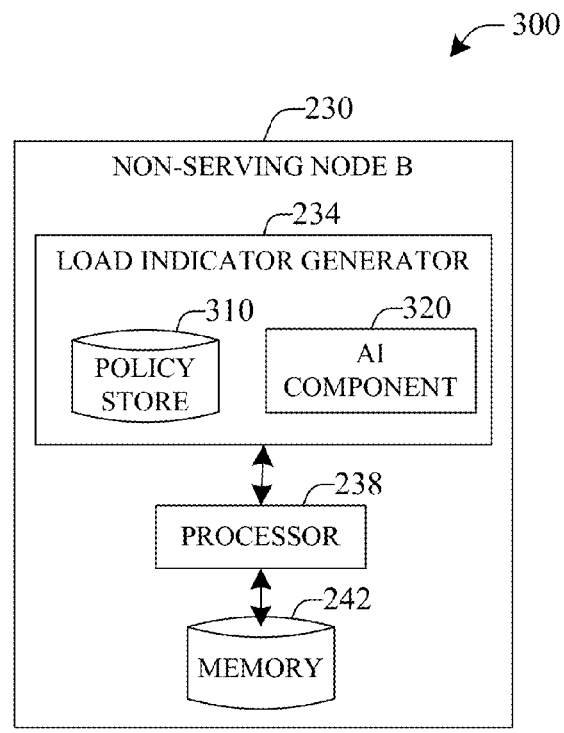
FIGS. 3A and 3B are block diagrams of example embodiments of a mobile terminal and an access point according to aspects described herein.

FIG. 3A illustrates a block diagram 300 of a base station that relies on a policy store 310 and an artificial intelligence (AI) component 320 to determine generation of load indicators. Policy store 310 contains policies that determine the time interval $\Delta t$ at which an interference metric is determined, and the magnitude of interference metric thresholds that are to be applied when generating a load indicator. Policies can determine thresholds for each subband employed in a FFR pattern, or average thresholds over subbands (see below). It is noted that policies can change over a period of time based on historical data of system response to interference management; changes are adaptive, e.g., typically effected to optimize the policies in order to achieve higher level of interference control, such as reduced fluctuations around a sector's target for a determined interference metric, shorter time-to-target (initial adjustment period of time during control necessary to drive a controlled quantity to a magnitude near a target value from a starting control state), and so on. Policies can be transferred among disparate sectors through backhaul network communication 250. It should be appreciated that disparate neighboring base stations (e.g., $230_1$-$230_N$) can have disparate policies for generation of a load indicator based on interference metric; thus not all non-serving base stations communicate load indicators $246_1$-$246_N$ simultaneously. It should be further appreciated that while policy store 310 is illustrated as a stand-alone storage component it can partially or entirely reside in memory 242.

AI component 320 can collect historic data on interference metrics and infer/project interference levels based on various aspects of communication such as number of user in a cell; type of users (e.g., data intensive user, latency sensitive users, users with extended periods of activity or sporadic user); weather and geographic conditions; as well as seasonal conditions, such as increased foliage in cell during spring, rain in summer, heavy snow in winter, and so on. Inference/projection of interference metrics can be based on multi-agent modeling or game theory, as well as other advanced mathematical algorithms (see below). Based on projected interference metrics, AI component 320 can change policies for generating load indicators. Revised policies can request that a base station (e.g., non-serving node B J $230_J$) determine interference metrics at specific intervals, and during specific periods of times (specific times in a day, a month, a year) reduce those time intervals or increase them, even suspending measurements for a specific period of time. Additionally, revised policies can alter the magnitudes of interference metrics thresholds for subbands in which a sector operates, resulting in time-dependent thresholds.

As employed hereinbefore, and in other portions of the subject description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above in connection with policies for load indicator generation and other automated aspects relevant to the subject innovation described herein, an AI component (e.g., component 320) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

Figure 3B:
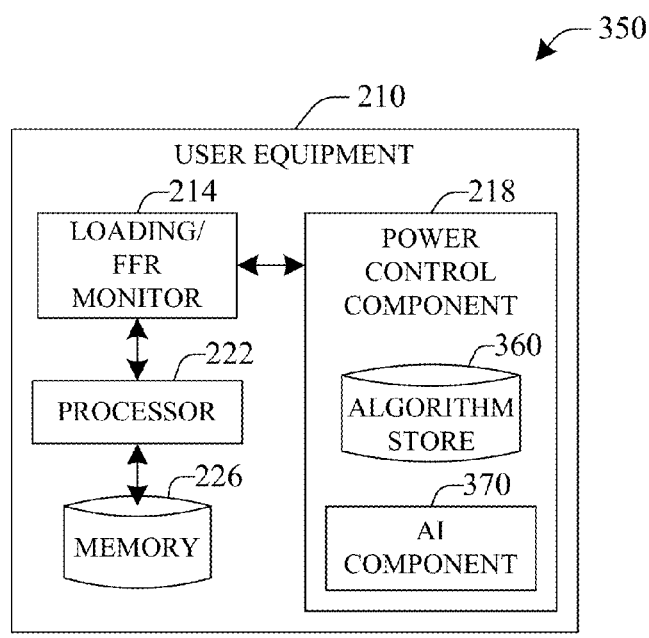

FIG. 3B is block diagram 350 of a mobile terminal with a power control component that relies on an artificial intelligent component to infer an optimal power adjustment/control algorithm. As discussed previously control algorithms can include open and close control loops, which involve power adjustments that can depend on the magnitude of an interference metric employed to determine load indicators, or can be a fixed offset. Additionally, power adjustments can be inferred based at least on specific applications executed by UE 210 and/or data transmitted by the user equipment 210. In an aspect, for sectors wherein terminals execute data sensitive applications, such as wireless on-line banking, adjustment of power can be more aggressive, e.g., larger power adjustment offsets, than in cases in which applications wherein data integrity is not critical to the user (e.g., internet browsing/searching) and communication sessions can be (temporarily) lost/halted. In another aspect, various relationships among power adjustment and magnitude of an interference metric, and algorithms based on interference metrics, can be used depending on the range of interference present in a sector. Such algorithms can reside in an algorithm store 360. It should be appreciated that while in embodiment 350 the algorithm store is a stand-alone component residing in power control component 218, store 360 can partially or entirely reside in the UE's memory 226.

Artificial intelligence component 370, can infer a power adjustment based on the various variables mentioned above. Based on machine learning techniques, AI component 370 can determine an optimal power offset to mitigate interference inflicted in neighboring sectors. While the addition of an AI component to mobile terminal 210 can increase complexity, the advantage of inferring optimal power adjustments offsets costs associated with that complexity. In connection with the added complexity, multi-core processors (e.g., processor 222) can be employed to handle the computational demand of operating an AI component while simultaneously operating the UE. It should be appreciated that other alternative architectures for processor 222 can be utilized for efficient operation of an AI component (e.g., 370). Furthermore, depending on the application executed by terminal 210, a terminal's display graphics processing unit can operate AI component while graphical user interface in the phone is not actively used, such as is the case in a voice-only communication or data application with low-frequency display refresh, etc.

Figure 4:
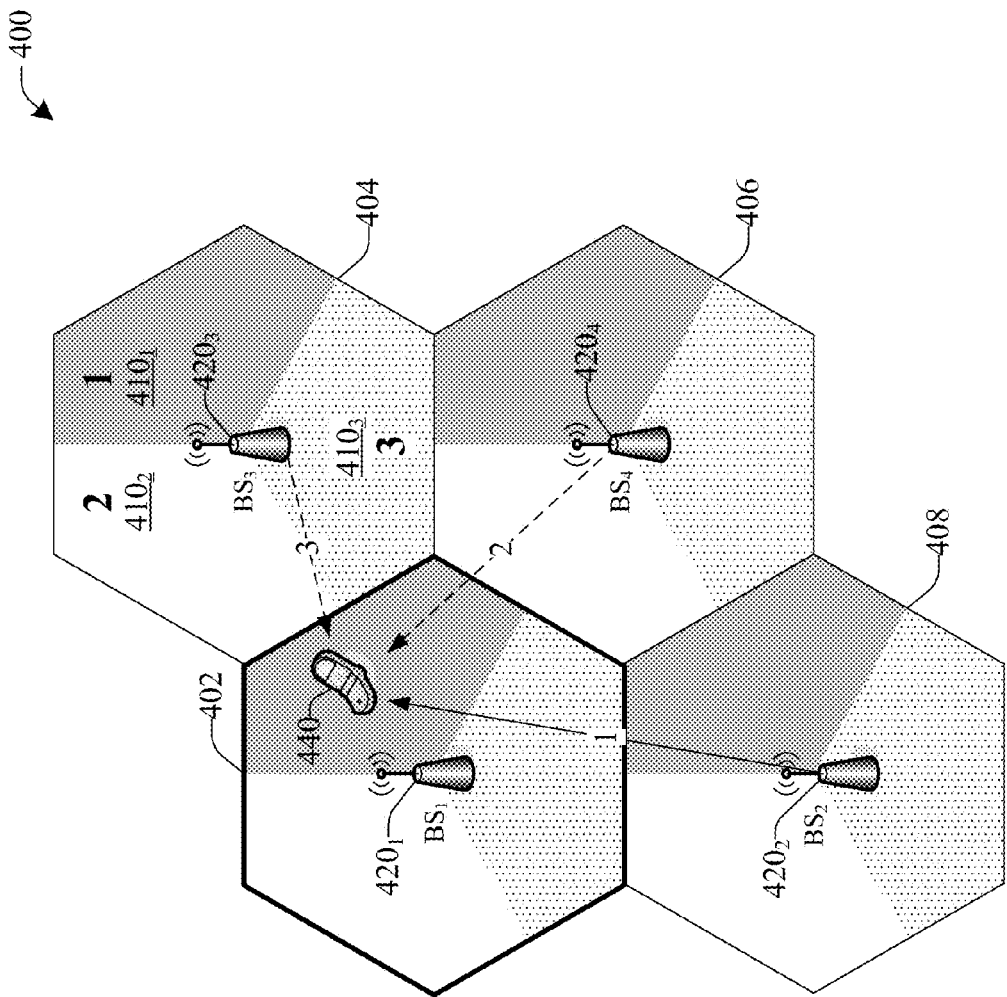
FIG. 4 illustrates an example wireless communication system operating with a fractional frequency reuse ⅓.
Figure 4:
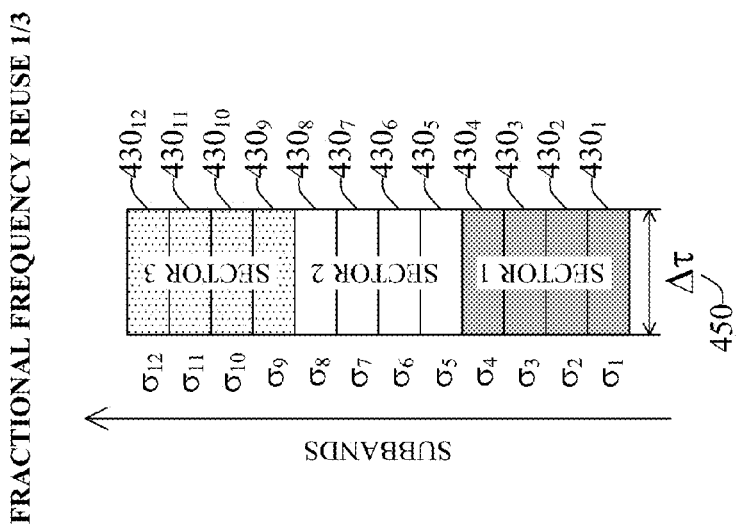

FIG. 4 illustrates a system 400 comprising sectorized wireless communication cells with fractional frequency reuse n/N=⅓ in which a terminal selectively decodes/responds to load indicator. Each cell 402-408 (served by base stations $BS_1$-$BS_4$ ($420_1$-$420_4$)) is partitioned in three sectors $410_1$-$410_3$, with each of these sectors operating in a single chunk of frequencies (subbands) indicated pictorially with a distinctive filling in each of the sectors $410_1$-$410_3$. It is noted that while only three sectors are illustrated, higher degrees of sectorization are possible. Sector 1 $410_1$ operates in subbands $\sigma_1$-$\sigma_4$ ($430_1$-$430_4$), sector 2 $410_2$ in bands $\sigma_5$-$\sigma_8$ ($430_5$-$430_8$), and sector 3 in $\sigma_9$-$\sigma_{12}$($430_9$-$430_{12}$). Finer or coarser subband division of the available BW is possible. Terminal 440, served by base station $BS_1$ $420_1$ can receive or "listen" to load indicators (indicated with arrows) from non-serving sectors 1, 2, and 3; yet, because UE 340 does not operate in any of frequency bands $\sigma_1$-$\sigma_8$, employed by sectors 2 and 3, this terminal does not decode/respond (broken-line arrows) to load indicators originated sectors 2 and 3 even though such sectors can be overloaded and their associated FL SINR at UE 440 can be large.

As mentioned above, FFR pattern $410_1$-$410_3$ and corresponding frequencies can be maintained for a time interval $\Delta\tau$ 450, after which a new FFR pattern can be determined (e.g., an FFR pattern update) by the base stations that serve each sectors. Changes in FFR pattern changes can involve re-partitioning the available system bandwidth in response to creation of a new sector(s); increasing/decreasing the reuse; or switching to a larger bandwidth operation, employing newly added subbands for specific terminal executing specific applications, e.g., a terminal downloading files, or a terminal streaming video. It is noted that as a consequence of an FFR update, terminal 440 can alter the load indicators that it decodes.

Figure 5A:
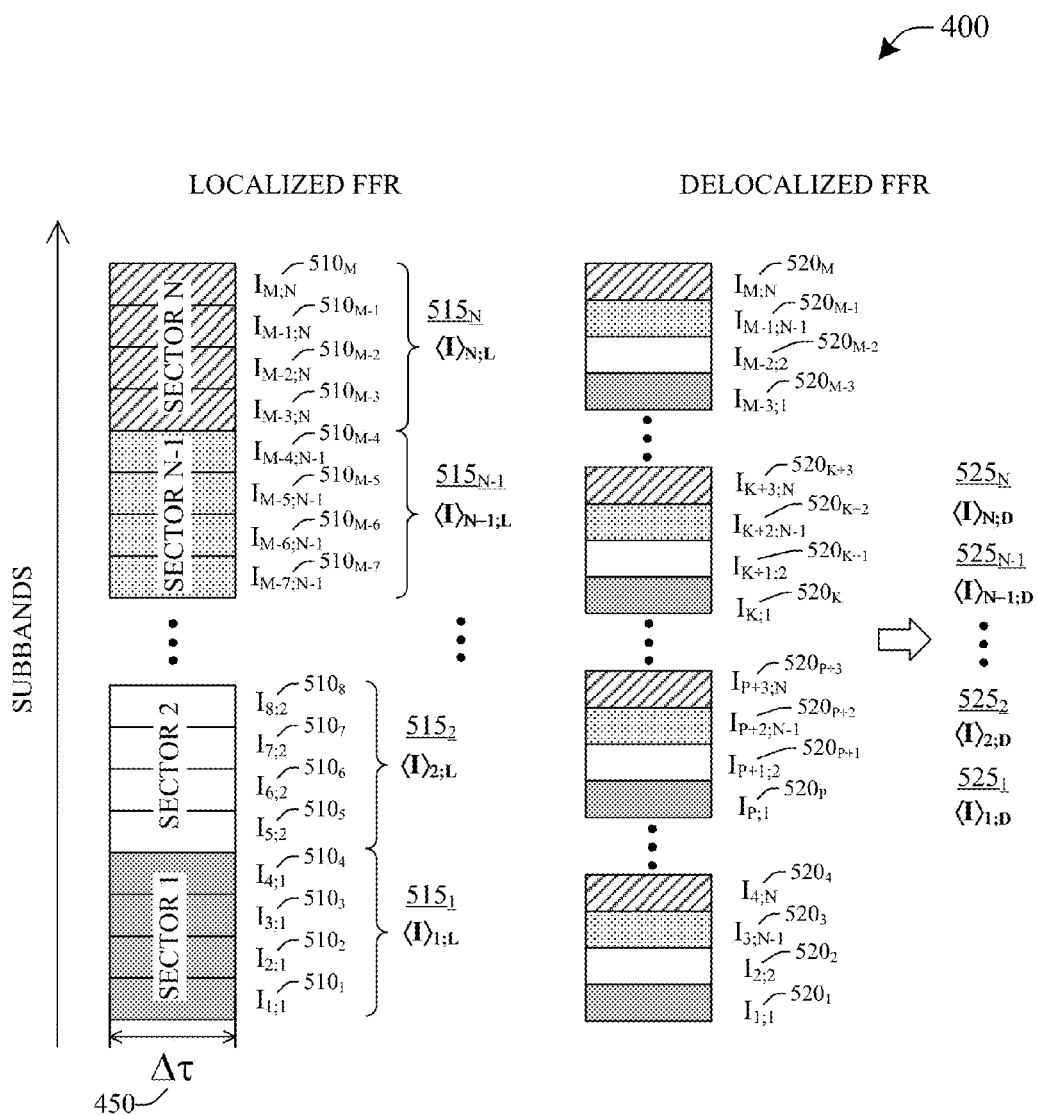
FIGS. 5A and 5B are schematic diagrams of interference metrics and load indicators determination according to aspects disclosed in the subject specification.

FIG. 5A illustrates fractional frequency reuse patterns and determination of interference metrics employed for power control. Localized FFR and delocalized FFR are shown. Each of these FFR pattern span a time interval $\Delta\tau$ 450. In both of such instances of FRR, system bandwidth is divided in M subbands and N sectors are assigned n=4 subbands, resulting in a reuse of 4/M. It should be appreciated that n=4 is presented for the sake of explanation and illustration, rather than limitation, and other choices for n are possible and within the scope of the subject specification. In localized FFR, subbands assigned to a sector are contiguous and occupy specific frequency intervals, whereas in delocalized FFR subbands are interleaved. It should be appreciated that each subband in FIG. 5A can include G subcarriers. Interference metrics $\{I_{\sigma;S}\}$ $510_1$-$510_M$ and $520_1$-$520_M$ are associated with a subband $\sigma$ and a corresponding sector S. As examples, the set $\{I_{M-7;N-1}$ $510_{M-7}$, $I_{M-6;N-1}$ $510_{M-6}$, $I_{M-5;N-1}$ $510_{M-5}$, $I_{M-4;N-1}$ $510_{M-4}\}$ comprises interference metrics for subbands M-7 to M-4, which correspond to sector N-1, whereas the set $\{I_{M;N}\ 520_M, I_{K+3;N}\ 520_{K+3}, I_{P+3;N}\ 520_{P+3}, I_{4;N}\ 520_4\}$. It should be appreciated that each of interference metrics $510_1$-$510_4$ and $520_1$-$520_M$ can correspond to an average over subcarriers, as discussed above such average can arise from the resolution of an instrument that determines interference.

In an aspect, interference metrics associated with subbands assigned to a sector S, e.g., sector N, are averaged, leading to averages $\langle I \rangle_{1;L}$ $415_1$-$\langle I \rangle_{N;L}$ $515_N$ for localized FFR and $\langle I \rangle_{1;D}$ $525_1$-$\langle I \rangle_{N;D}$ $525_N$ for delocalized FFR. Such average can be employed to compare with an interference threshold $I_{TH}$ and determine whether an interference metrics in the sector is above or below a threshold. It should be appreciated that the average of an interference metrics can be determined over a time interval $\Delta\tau'$ that is shorter than $\Delta\tau$ 450. As an example, interference can be probed in a subband at a predetermined rate, e.g., a measurement every specific number of frames, such as every radio frame or superframe (e.g., in LTE, a radio frame spans 10 ms). The probe rate can be adjusted according to various parameters, such as cell load and/or traffic, channel conditions, etc.

The average of an interference metrics over subbands, such as $515_1$-$515_N$ and $525_1$-$525_N$, can be an arithmetic average, a geometric average, or a harmonic average. Each of the subband averages can be a weighted average; for instance in an arithmetic average, each subband interference metric $I_{o;S}$ associated with a sector S is multiplied by a weight $w_{o;S}$, which is a scalar number, prior to determining an average $\langle I \rangle_{S;a}$ (a=L,D). Such averages can be computed by processor 238. It should be appreciated that weights $w_{o;S}$ can allow taking into account systematic factors, such as instrument response, e.g., a determination of a subband interference metric at a specific frequency range is probed with lower accuracy than at other frequency ranges, in the determination of an interference metric. Weights $w_{o;S}$ are normalized to unity over bands assigned to sector S, and can depend on frequency, time, channel conditions, sector load and traffic, and so forth. In an aspect, weights can be determined/inferred by an AI component (e.g., component 320), based on historic values of the weights and other historic or current data available for inference or analysis.

Figure 5B:
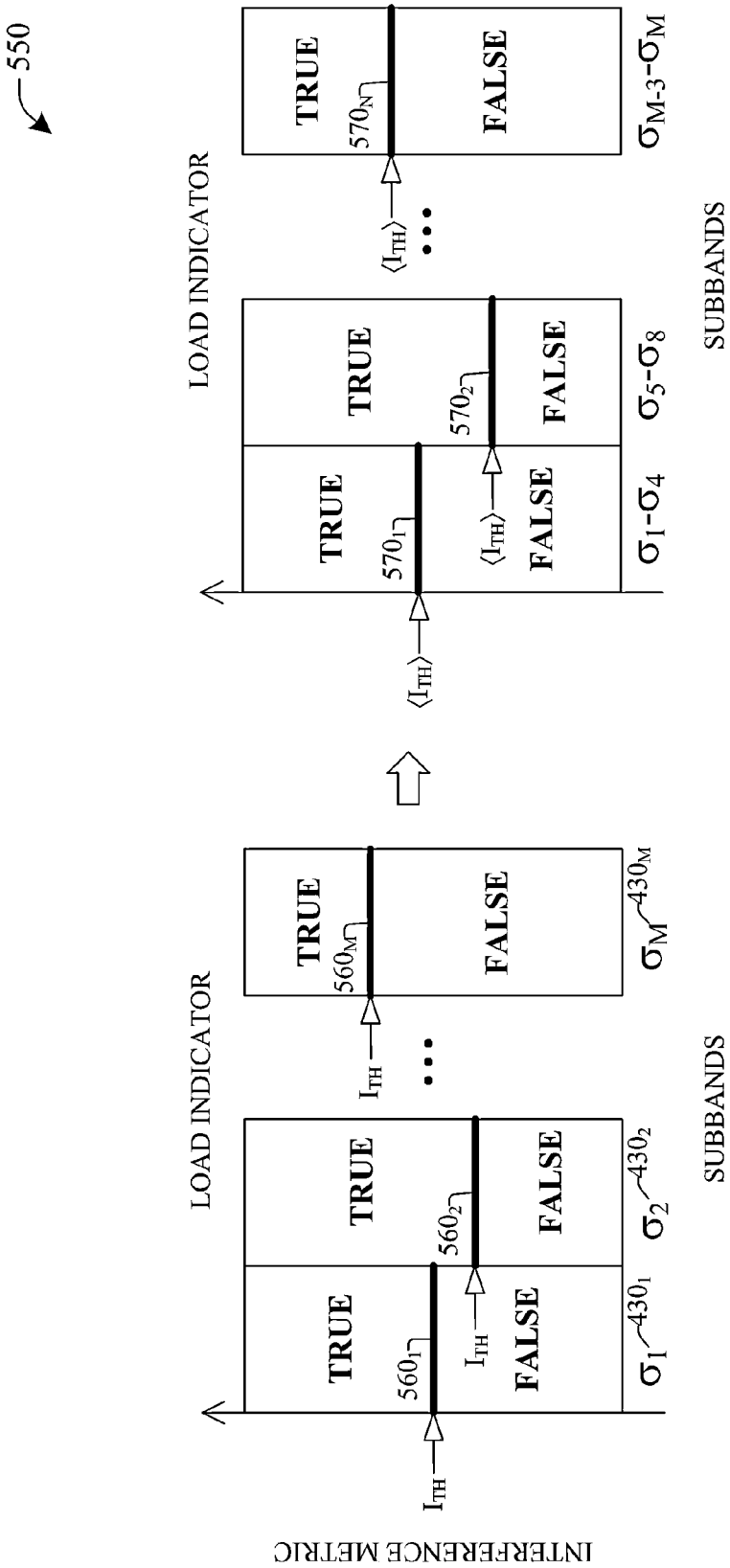

FIG. 5B illustrates an interference metric threshold $I_{TH}$ and respective logic values (e.g., "true" or "false") as a function of frequency subbands. Each subband $430_1$-$430_M$ possesses an interference metric threshold $I_{TH}$ $560_1$-$560_M$, which affect the range of interference metrics that correspond to "true"/"false" load indicators. Subband thresholds can lead to average thresholds $\langle I_{TH} \rangle$ $570_1$-$570_M$ for subbands sets associated with sectors 1 to N. Such averages can be computed by processor 238. It should be appreciated that such averaging can be performed for localized FFR and delocalized FFR. Each of the subband averages $570_1$-$570_N$ can dictate the logic state of a load indicator. As time progresses, thresholds $560_1$-$560_M$, and average thresholds $570_1$-$570_M$, can change to reflect new FFR reuse that takes effect in a communication sector, e.g., $410_1$-$410_3$. It should be appreciated that the averages $\langle I_{TH} \rangle$ $570_1$-$570_M$ can be arithmetic, geometric or harmonic averages of the thresholds associated with the available frequency resources (e.g., $510_1$-$510_M$). Additionally, said averages can be weighted averages, with the weights entering in the averaging procedure determined according to available historic values of the weights. It is noted that as interference metric thresholds $I_{TH}$ $560_1$-$560_M$ are time dependent through the policy that determines its magnitude, averages thresholds $570_1$-$570_M$ are also time dependent.

Figure 6:
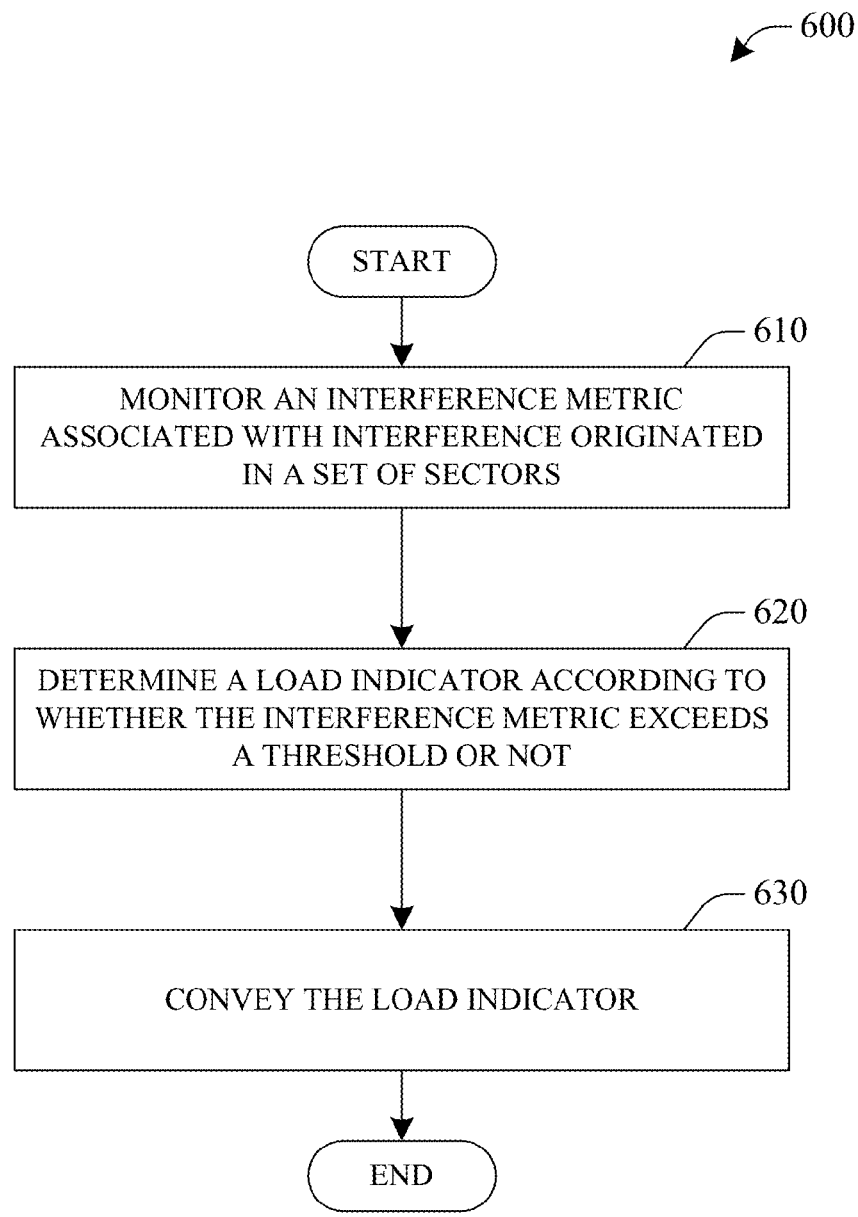
FIG. 6 presents a flowchart of an example a method for determining a load indicator in connection with inter-cell power control in the presence of fractional frequency reuse according to aspects set forth herein.
Figure 7:
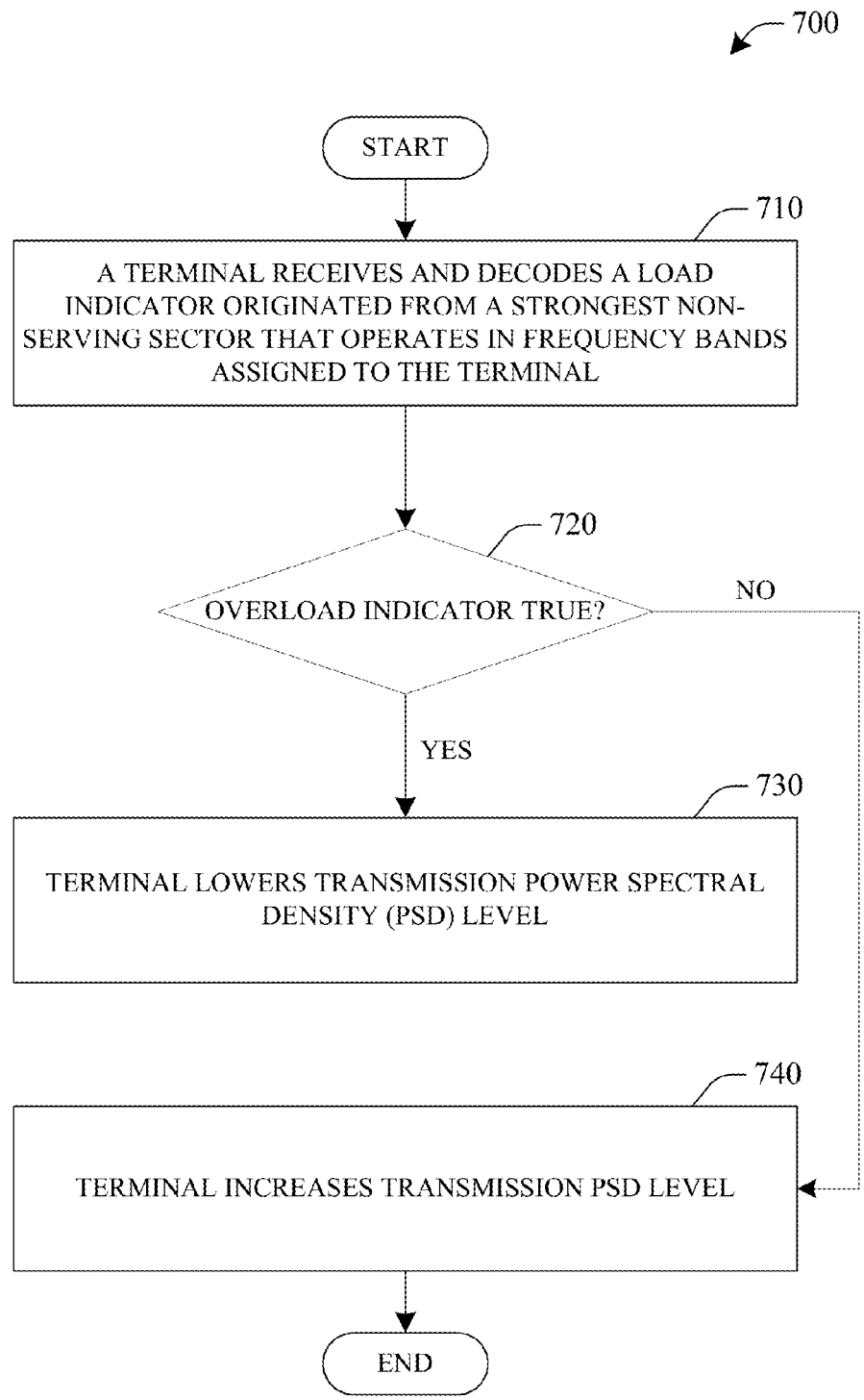
FIG. 7 presents a flowchart of an example method for controlling power in the presence of fractional frequency reuse in accordance with aspects described herein.
Figure 8:
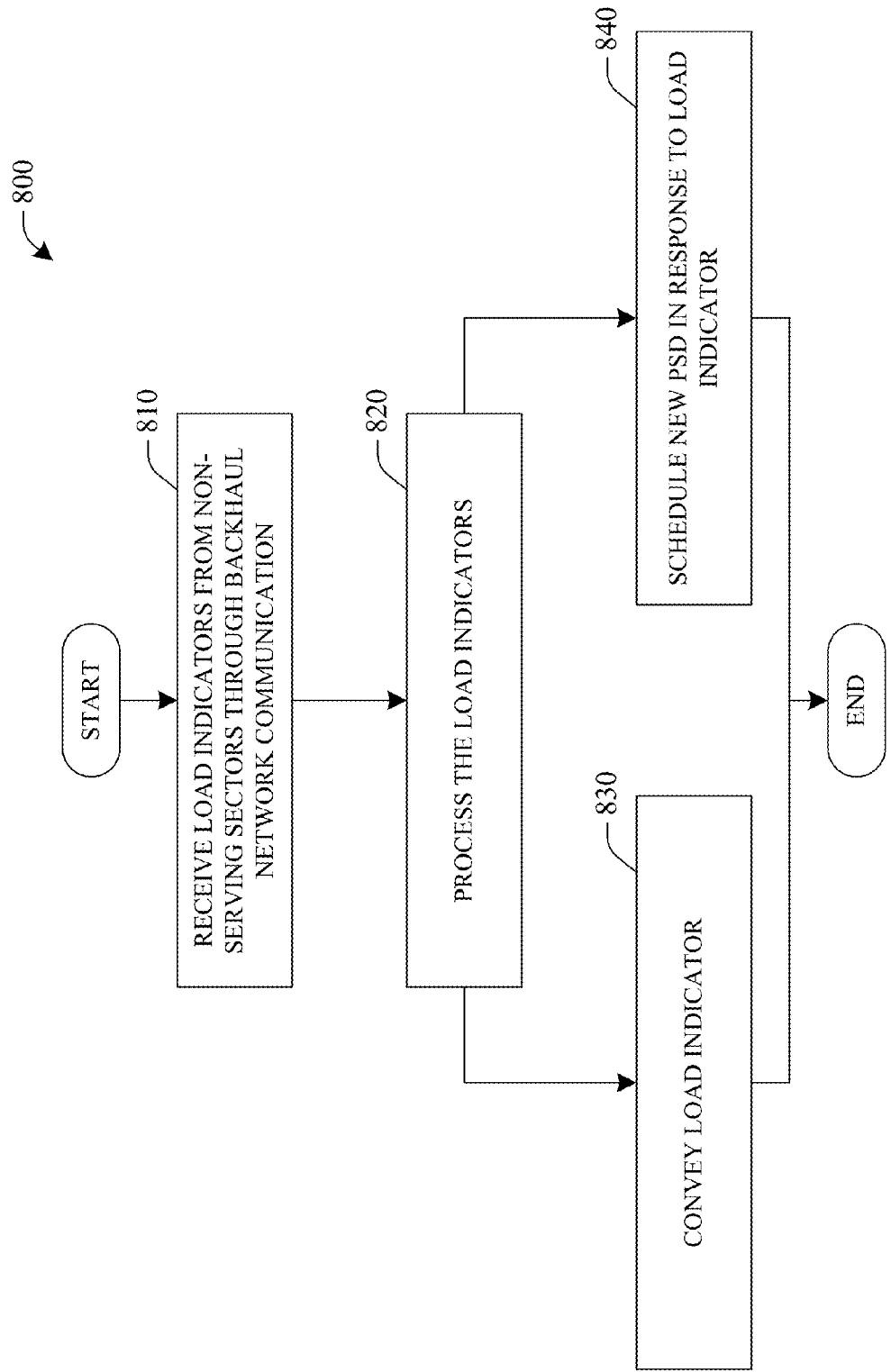
FIG. 8 presents a flowchart of an example method for controlling power through a serving base station in accordance with aspects disclosed herein.

In view of the example systems presented and described above, methodologies for inter-cell power controls that may be implemented in accordance with the disclosed subject matter will be better appreciated with reference to the flowcharts of FIGS. 6-8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 presents a flowchart of a method 600 for determining a load indicator in connection with inter-cell interference in the presence of fractional frequency reuse. At 610, an interference metric is monitored. The interference metric (e.g., an interference-to-thermal noise ratio, a signal-to-interference ratio, a signal-to-noise ratio, a signal-to-interference-and-noise ratio, and so on) is associated with interference originated in a set of sectors. Typically, terminals transmitting at elevated power or power spectral density can be responsible for the generated interference. At 620, a load indicator is determined based on the magnitude of the interference metric with respect to a threshold value: If the interference metric exceeds a threshold, a load indicator adopts a logic state to reflect such relationship, such as "true." Likewise, if the interference metric is below a threshold a logic state of "false" can be assigned to the load indicator. In an aspect, the interference metric can be determined as a function of frequency, e.g., the interference metric is determined at specific subbands in frequency domain (see FIG. 5A). Similarly, interference metrics can be determined as a function of time, e.g., frames, superframes. In another aspect interference metrics can be average values over specific sets of time-frequency resources. It should be appreciated that due to experimental resolution, even an accurate interference measurement can involve an average over several subcarriers and frames rather than probing a single subcarrier in a single frame.

At 630, a load indicator is conveyed. Two possible routes for communication are possible: (i) over the air interface, through broadcast by a base station (e.g., non-serving Node B 1 $230_1$) that determined the load indicator, and (ii) by transmission of load indicators through the backhaul network. In an aspect, mechanism (i) presents the advantage to weakly affect communication latency between transmission of load indicator and reception at a non-served terminal (e.g., UE 440). Lack of significant latency improves response time regarding power control at the terminal necessary to reduce the magnitude of the interference metric associated with the load indicator. Mechanism (ii), offers the advantage of being insensitive to channel conditions, as the communication is point-to-point among base stations (e.g., $230_1$ and 260) through a wired or fiber optic network backbone, employing communication links such as T1/E1 lines or other links of the T-carrier/E carrier protocol, and/or packet-based internet protocol. Insensitivity to channel conditions can ensure that load indicators are properly received and processed, with ensuing power adjustments necessary to reduce interference. It should be appreciated, however, that backhaul communication of load indicators can incur significant latency. Nonetheless, depending on the application being executed by a terminal, a delay in power adjustment and interference control/mitigation can be tolerated.

FIG. 7 presents a flowchart of a method 700 for inter-cell power control in the presence of fractional frequency reuse. At 710, a terminal (e.g., UE 440) receives and decodes a load indicator (e.g., load indicator $246_J$) originated from a strongest non-serving sector that operates in frequency bands assigned to the terminal. The requisite that the non-serving sector operates in the frequency bands in which the terminal operates provides for incorporating fractional frequency reuse into the inter-cell power control. Such frequency discrimination can enable the terminal to process load indicators of sectors in which the terminal can actually inflict significant interference. The "strongest" non-serving sector corresponds to the non-serving base station transmitting to the terminal with the highest channel conditions, e.g., highest SINR in the downlink (or forward-link) transmission. In an aspect, when the forward-link SINR of multiple non-serving base stations is substantially the same, or within a tolerance, the terminal can decode the load indicator of such plurality of non-serving sectors and determine a combined effective load indicator for power by taking into account the forward-link SINR of those non-serving sectors (e.g., find the weighted mean of the load indicators with the forward-link SINR as the corresponding weight, and then compare the weighted mean with a threshold to generate an effective load indicator) and/or additional characteristics of the communication conditions of the non-serving sectors, such as number of users in the cells served by the sectors transmitting the load indicators. It is noted that such an effective load indicator takes the place of the load indicator associated with the strongest non-serving sector. The logical state of a load indicator—e.g., "true" in case the received interference metric exceeds a threshold value, or "false" in case said metric is below the threshold—is checked at 720. In the case the load indicator is "true," at 730 the terminal lowers its transmission power spectral density (PSD) level, whereas if the load indicator is "false" at 740 the terminal increases its transmission PSD level. In an aspect, such power control can be effected through a power control component, such as component 218, in the terminal.

FIG. 8 presents a flowchart of a method 800 for inter-cell power control through a serving base station. At 810, a set of load indicators issued by neighboring non-serving sectors are received through backhaul network communication. Such communication allows distant non-serving sector to convey load indicators even in poor channel conditions, as the communication takes place over the wired (e.g., twisted pair, optic fiber, and so on) network backbone. In an aspect, such communication can be packet switched, internet protocol (IP) based (such is the case in UMB). At 820, the received load indicators are processed/decoded, determining what indicators arise from sectors that operate in the same frequency subbands assigned to a terminal (e.g., 440) that operates in a serving sector (e.g., $410_1$), and their logical state. At 830, a combined effective load indicator that takes into account the load indicators from substantially all strong (e.g., high FL SINR) non-serving sectors that operate in the same frequency intervals as the terminal is conveyed via the air interface. Alternatively, at 840 a new transmission PSD is assigned to the terminal (through scheduler 264, for example). Such an assignment takes place in a similar manner as discussed hereinbefore in connection with functionality of power control component 218 in terminal 210, and control of the UE's transmission power.

Figure 9A:
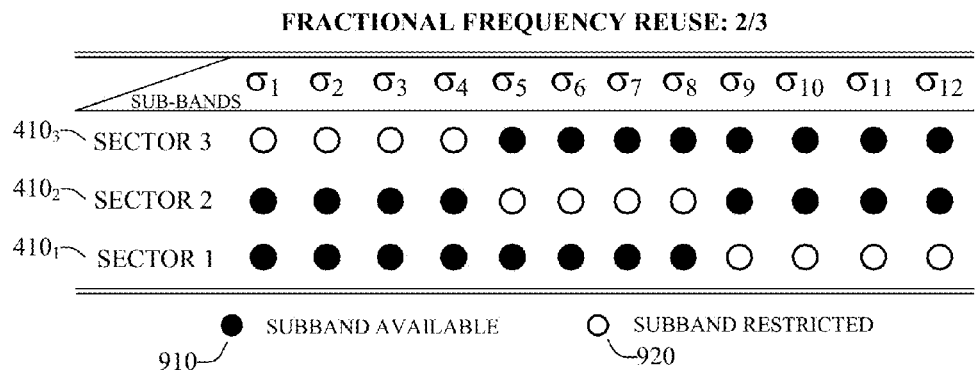
FIGS. 9A, and 9B and 9C illustrate, respectively, a frequency reuse table employed in inter-cell interference control simulations, and results of said simulations for interference behavior and cumulative distributions for terminal throughput based on disparate power control schemes.

Next, example method 700 for power control in the presence of FFR is illustrated through simulations. The modeled wireless communication system comprises 19 Node B in a wrap-around layout with three-sector cells (see FIG. 3). Interference is probed every 10 ms (which corresponds to a radio frame in LTE). In addition, 10 terminals populate each sector, with speeds of up to 3 km/h, and a full buffer traffic model; each terminal scheduled according to proportional fair scheduling. A system bandwidth of 5 MHz is divided in 12 subbands $\sigma_1$-$\sigma_{12}$ under fractional frequency reuse ⅔; each band includes 25 subcarriers. FIG. 9A displays the reuse table employed in the simulations. Solid black (910) and open (920) circles indicate, respectively, restricted and available subbands for a sector. System BW is divided in N=12 chunks and each sector $410_1$-$410_3$ is assigned n=8 subbands; four of which are assigned simultaneously to pairs of sectors. It should be appreciated that such reuse can result in increased interference in the sector sharing subbands, data transmission rate can be increased in each sector as a higher number of subcarriers is employed for communication. Furthermore, other FFR patterns can be employed in simulations, with substantially the same findings as presented herein below. Further yet, the simulation results presented below correspond to load indicators (e.g., $246_1$-$246_N$) transmitted over an air interface; however, qualitatively same results can be expected in the case that the load indicators are conveyed over the backhaul network (e.g., 250).

Figure 9B:
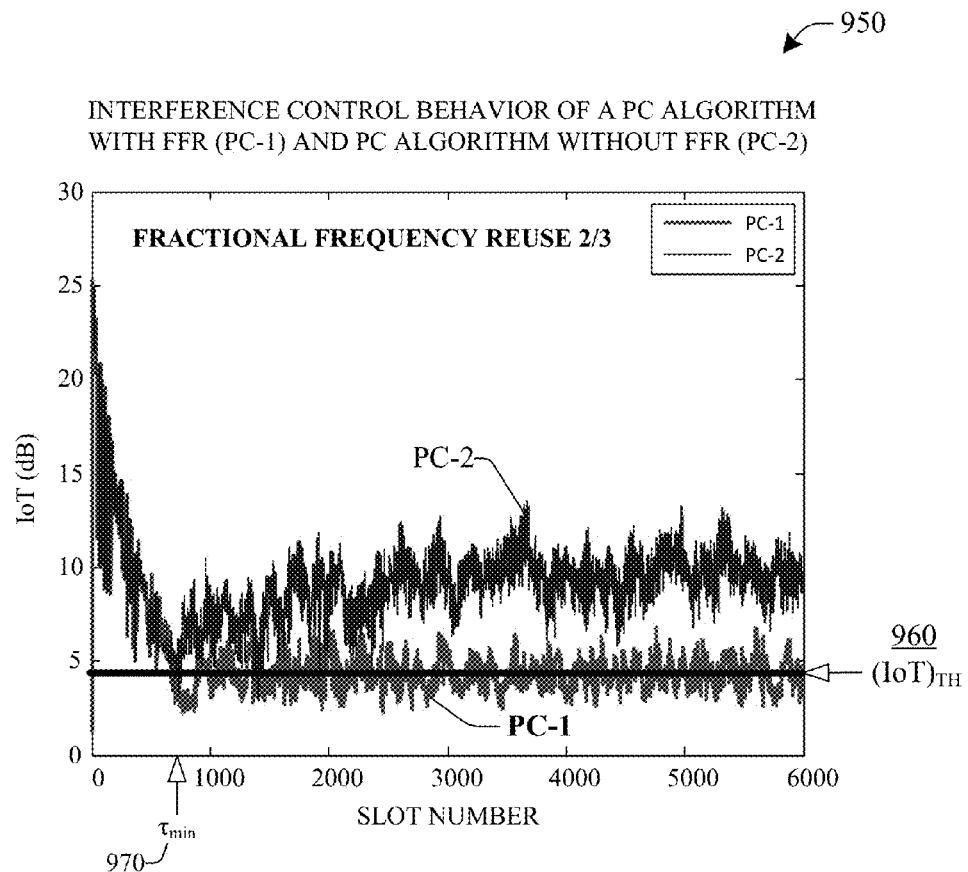

FIG. 9B illustrates a plot 950 of an interference metric as a function of time (interference adaptation) determined at a base station. Plot 950 compares the performance of the subject inter-cell power control method 700, labeled herein PC-1, which incorporates FFR, and a conventional inter-cell power control algorithm (PC-2) which fails to incorporate FFR: When employing conventional scheme PC-2, a terminal (e.g., UE 440) is blind to the FFR pattern adopted in a wireless communication system; in contrast, the subject algorithm PC-1 requires that the UE be aware of the underlying FFR implantation in order to selectively (in frequency domain) decode appropriate load indicators conveyed by sectors operating in frequency subbands scheduled for the terminal operation. As discussed above, within PC-2, a terminal such as UE 440 decodes load indicators generated by its neighboring non-serving sectors which can actually employ substantially disparate frequency bands from the terminal performing the decoding. In the simulation, the interference metric corresponds to interference-over-thermal noise (IoT) and an interference metric threshold $I_{TH}$= $(IoT)_{TH}$ 960 is set to 4.41 dB; it should be appreciated, however, that substantially any other value can be set as a threshold. Moreover, a single threshold is employed in the simulations even though 12 subbands are available for communication. Interference metrics simulated in each sector are averaged over (8) subbands that are available to the sector and then compared to $I_{TH}$ 960. It is noted that other interference metrics can be employed in the simulations and yield substantially the same results as illustrated in plot 950. Namely, PC-1 leads to an accurate control of IoT in the wireless system, with fluctuations remaining within 4 dB around the target threshold $(IoT)_{TH}$=4.41 dB for a period of at least 5000 slots after an adjustment interval $\tau_{min}$ 970 of nearly 800 slots (for example, in LTE a slot spans 0.5 ms).

From plot 950, it can be appreciated that conventional power control method PC-2 fails to control the IoT: After an adjustment period, IoT reaches a minimum at near the set threshold value $I_{TH}$=4.41 dB 960 and gradually increases, exhibiting fluctuations of about 6-7 dB about an IoT average value of ~8 dB, which is above target $I_{TH}$ 960. The origin of such lack of adequate control is that in the PC-2 scheme there is no frequency discrimination; thus, when a load indicator is decoded by a terminal (e.g., UE 440) such indicator is not related to the PSD level of the terminal—the PSD levels is determined by the ratio between transmitting power scheduled for the terminal and the number and frequency of subcarriers assigned to the terminal. The PSD level of the terminal is accounted for in PC-1, through the incorporation of the FFR pattern into the processing of load indicators. Therefore, inter-cell power control is improved with respect to PC-2.

Figure 9C:
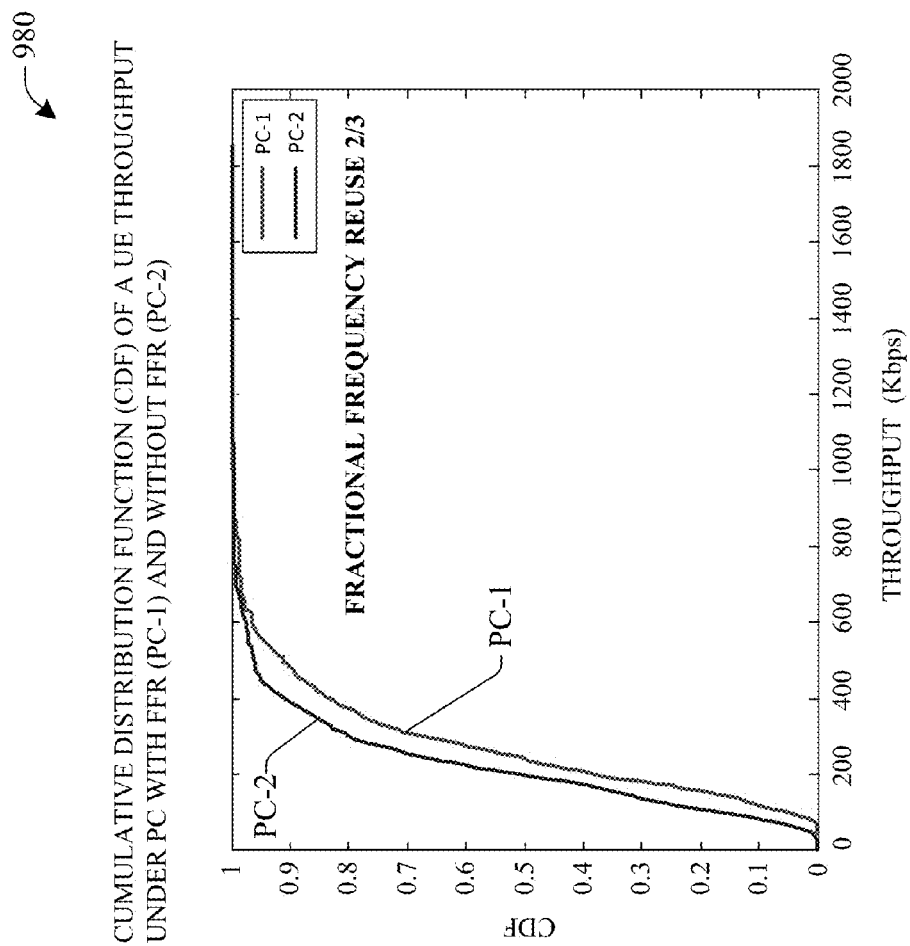

FIG. 9C displays a plot 980 of simulated cumulative distribution functions (CDFs) of a terminal (e.g., UE 440) throughput for power control PC-1 disclosed herein, and conventional power control method PC-2. As described above, in connection with FIG. 9A, the simulated wireless communication system comprises 570 UEs uniformly deployed within 57 sectors. Other parameters in the simulation are the same as those described above. It is readily apparent from plot 980 that the subject algorithm PC-1 (700, FIG. 7) outperforms the conventional algorithm PC-2. A direct comparison of the average IoT level $\langle IoT \rangle$ in a sector, and average sector throughput $\langle \eta \rangle$ for PC-1 and PC-2 reveals: $\langle IoT \rangle^{(PC-1)}$=4.43 dB and $\langle \eta \rangle^{(PC-1)}$=2.75 Mbps, whereas $\langle IoT \rangle^{(PC-2)}$=8.06 dB and $\langle \eta \rangle^{(PC-2)}$=2.23 Mbps. The subject power control algorithm (PC-1) results in significant decrease of interference level and an increase of sector throughput when compared to the conventional algorithm PC-2.

To summarize FIGS. 9A, 9B and 9C, it is noted that a conventional inter-cell power control algorithm fails to work effectively when fractional frequency reuse is adopted in the uplink of a wireless communication system such as LTE. The disclosed scheme for power control, results in efficient and accurate control of interference metric levels (illustrated with IoT) at a base station in the presence of FFR, while sector throughput is optimized.

Figure 10:
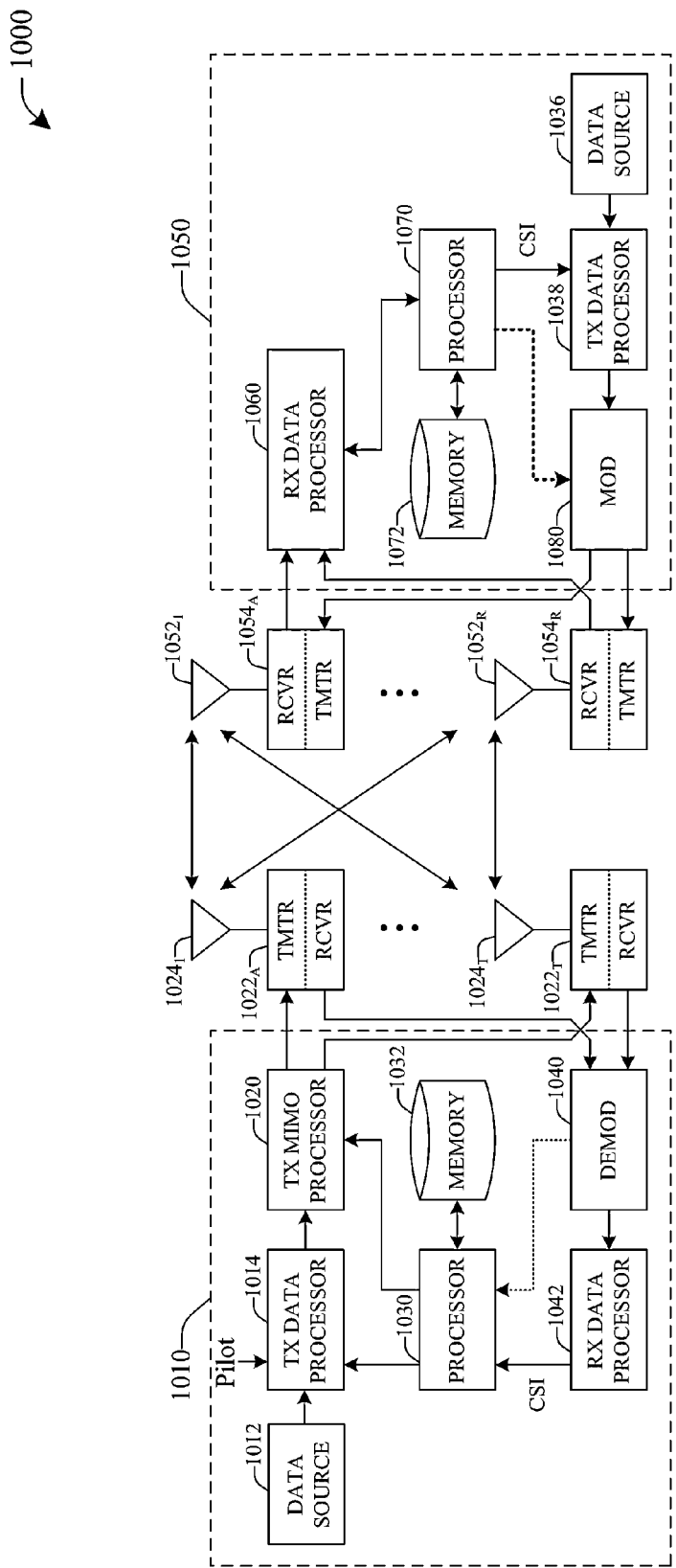
FIG. 10 is a block diagram of an embodiment of a transmitter system and a receiver system in a multiple-input multiple-output operation deployment that provide for cell/sector communication in accordance with one or more aspects set forth herein.

FIG. 10 is a block diagram 1000 of an embodiment of a transmitter system 1010 (such as base station 260, or any of BSs $230_1$-$230_N$) and a receiver system 1050 (e.g., access terminal 240) in a multiple-input multiple-output (MIMO) system that can provide for cell/sector communication in a wireless communication environment in accordance with one or more aspects set forth herein—e.g., inter-cell power control in the presence of FFR can occur as described hereinbefore in connection with FIGS. 7, 8, and 9. At the transmitter system 1010, traffic data for a number of data streams can be provided from a data source 1012 to transmit (TX) data processor 1014. In an embodiment, each data stream is transmitted over a respective transmit antenna. TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 1030, the instructions as well as the data may be stored in memory 1032.

The modulation symbols for all data streams are then provided to a TX MIMO processor 1020, which may further process the modulation symbols (e.g., OFDM). TX MIMO processor 1020 then provides $N_T$ modulation symbol streams to $N_T$ transceiver (TMTR/RCVR) $1022_A$ through $1022_T$. In certain embodiments, TX MIMO processor 1020 applies beamforming weights (or precoding) to the symbols of the data streams and to the antenna from which the symbol is being transmitted. Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $1022_A$ through $1022_T$ are then transmitted from $N_T$ antennas $1024_1$ through $1024_T$, respectively. At receiver system 1050, the transmitted modulated signals are received by $N_R$ antennas $1052_1$ through $1052_R$ and the received signal from each antenna 1052 is provided to a respective transceiver (RCVR/TMTR) $1054_A$ through $1054_R$. Each transceiver $1054_1$-$1054_R$ conditions (e.g., filters, amplifies, and downconverts) a respective received signal, digitizes the conditioned signal to provide samples, and further processes the samples to provide a corresponding "received" symbol stream.

An RX data processor 1060 then receives and processes the $N_R$ received symbol streams from $N_R$ transceivers $1054_1$-$1054_R$ based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010. A processor 1070 periodically determines which precoding matrix to use, such a matrix can be stored in memory 1072. Processor 1070 formulates a reverse link message comprising a matrix index portion and a rank value portion. Memory 1072 may store instructions that when executed by processor 1070 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 1038, which also receives traffic data for a number of data streams from a data source 1036, modulated by a modulator 1080, conditioned by transceiver $1054_A$ through $1054_R$, and transmitted back to transmitter system 1010.

At transmitter system 1010, the modulated signals from receiver system 1050 are received by antennas $1024_1$-$1024_T$, conditioned by transceivers $1022_A$-$1022_T$, demodulated by a demodulator 1040, and processed by a RX data processor 1042 to extract the reserve link message transmitted by the receiver system 1050. Processor 1030 then determines which pre-coding matrix to use for determining the beamforming weights and processes the extracted message.

Single-user (SU) MIMO mode of operation corresponds to the case in which a single receiver system 1050 communicates with transmitter system 1010, as illustrated in FIG. 10 and according to the operation described above. It should be appreciated that in the subject mode of operation inter-cell power can be effected as described hereinbefore. In a SU-MIMO system, the $N_T$ transmitters $1024_1$-$1024_T$ (also known as TX antennas) and $N_R$ receivers $1052_1$-$1052_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, NR\}$. Each of the $N_V$ independent channels corresponds to a dimension.

In one aspect, transmitted/received symbols with OFDM, at tone ω, can be modeled by:

$$y(\omega) = \underline{H}(\omega)c(\omega) + n(\omega). \quad (1)$$

Here, y(ω) is the received data stream and is a $N_R \times 1$ vector, $\underline{H}(\omega)$ is the channel response $N_R \times N_T$ matrix at tone ω (e.g., the Fourier transform of the time-dependent channel response matrix $\underline{h}$), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 1010, and $N_V$ can be scheduled at the discretion of the transmitter (e.g., access point 250) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 1010 allocates to transmit each data stream $N_V$. It should be appreciated that such a power gain matrix can be a resource that is assigned to access terminal 240, and it can be managed through adjustment of power offsets as described herein. In view of the FL/RL reciprocity of the wireless channel, it should be appreciated that a transmission from MIMO receiver 1050 can also be modeled in the fashion of Eq. (1), including substantially the same elements. In addition, receiver 1050 can also apply pre-coding schemes prior to transmitting data in the reverse link.

In system 1000 (FIG. 10), when $N_T = N_R = 1$, the system reduces to a single-input single-output (SISO) system that can provide for sector communication in a wireless communication environment in accordance with one or more aspects set forth herein. Alternatively, a single-input multiple output (SIMO) mode of operation corresponds to $N_T > 1$ and $N_R = 1$. Furthermore, when multiple receivers communicate with transmitter system 1010, a multiuser (MU) MIMO mode of operation is established. Inter-cell power control in the presence of FFR according to aspects described herein can be employed in each of the abovementioned modes of operation.

Figure 11:
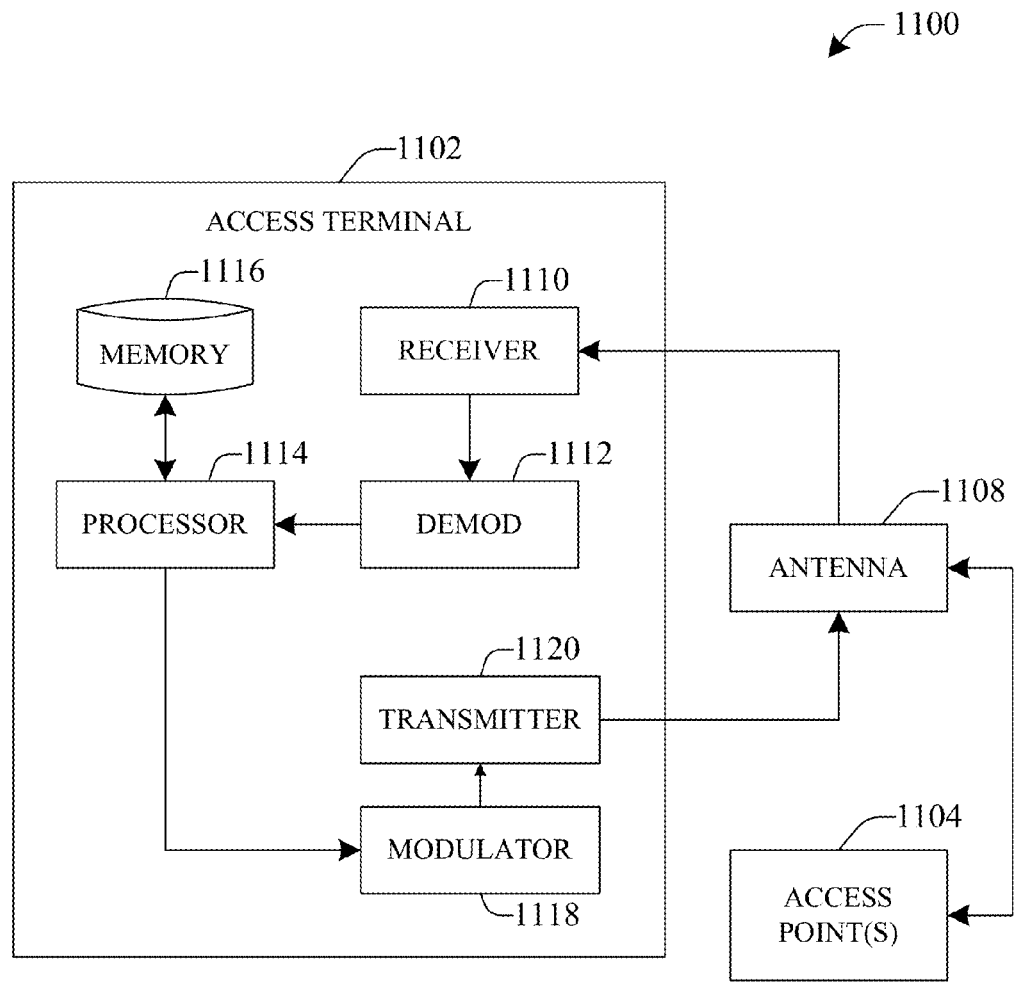
FIG. 11 is a block diagram of a system that receives and processes load indicators and adjusts a transmission power in wireless communication environment in accordance with various aspects described in the subject specification.

FIG. 11 is a block diagram of a system 1100 that monitors load indicators and effects power control associated with inter-cell interference metrics in accordance with various aspects described herein. In one example, system 1100 includes an access terminal 1102. As illustrated, access terminal 1102 can receive signal(s) from one or more access points 1104 and transmit to the one or more access points 1104 via an antenna 1108. Additionally, access terminal 1102 can comprise a receiver 1110, or substantially any other electronic appliance, that receives information from antenna 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to access terminal 1102. Additionally, access terminal 1002 can employ processor 1114 to perform methodology 700, and/or other appropriate methodologies. Access terminal 1002 can also include a modulator 1118 that can multiplex a signal for transmission by a transmitter 1120 via antenna 1108 to one or more access points 1104.

Figure 12:
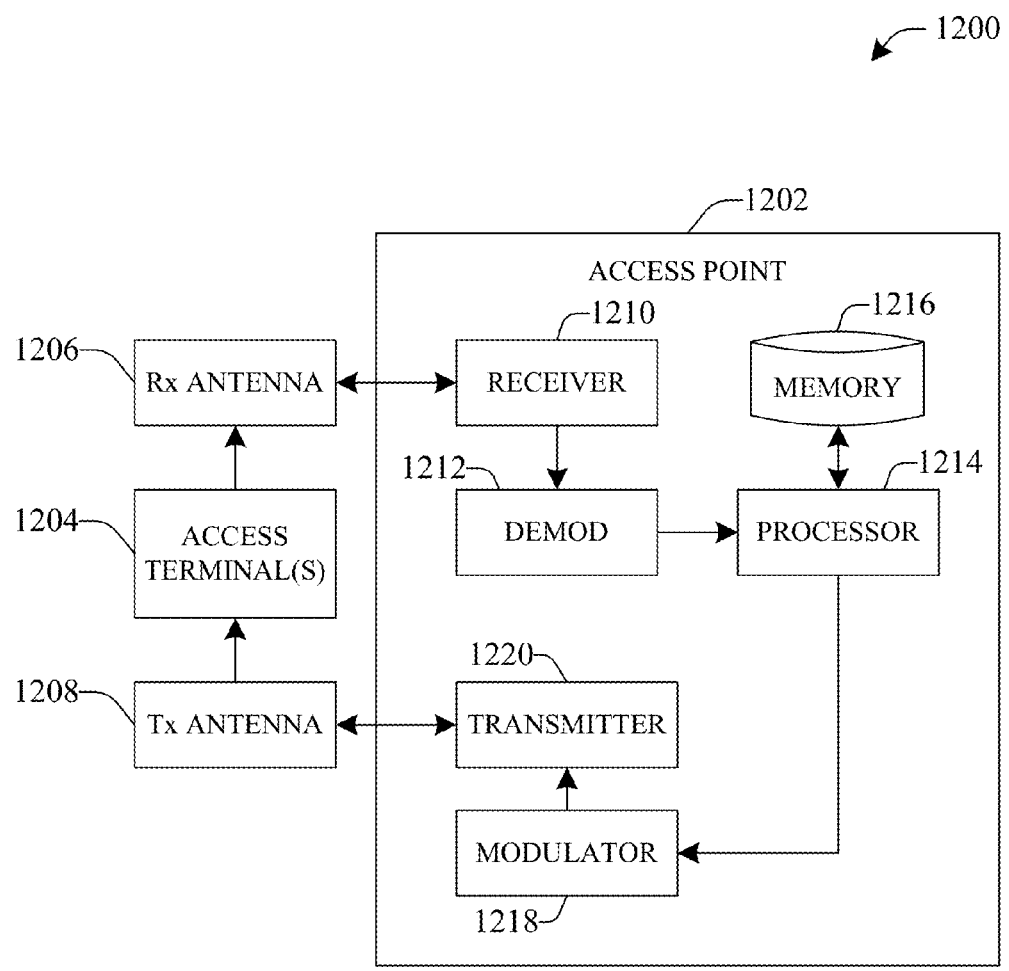
FIG. 12 is a block diagram of a system that generates and conveys load indicators in a wireless communication environment according to various aspects described herein.

FIG. 12 is a block diagram of an example system 1200 that facilitates generating load indicators, conveying load indicators, as well as scheduling power levels to terminals and other reverse link resources in a wireless communication system in accordance with various aspects described herein. In one example, system 1200 includes a base station or access point 1202. As illustrated, access point 1202 can receive signal(s) from one or more access terminals 1204 via a receive (Rx) antenna 1206 and transmit to the one or more access terminals 1204 via a transmit (Tx) antenna 1208.

Additionally, access point 1202 can comprise a receiver 1210 that receives information from receive antenna 1206. In one example, the receiver 1210 can be operatively associated with a demodulator (Demod) 1212, or substantially any other electronic appliance, that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Access point 1102 can also include a modulator 1218 that can multiplex a signal for transmission by a transmitter 1220 through transmit antenna 1208 to one or more access terminals 1204.

Next, systems that can enable aspects of the disclosed subjected matter are described in connection with FIGS. 13 and 14. Such systems can include functional blocks, which can be functional blocks that represent functions implemented by a processor or an electronic machine, software, or combination thereof (e.g., firmware).

Figure 13:
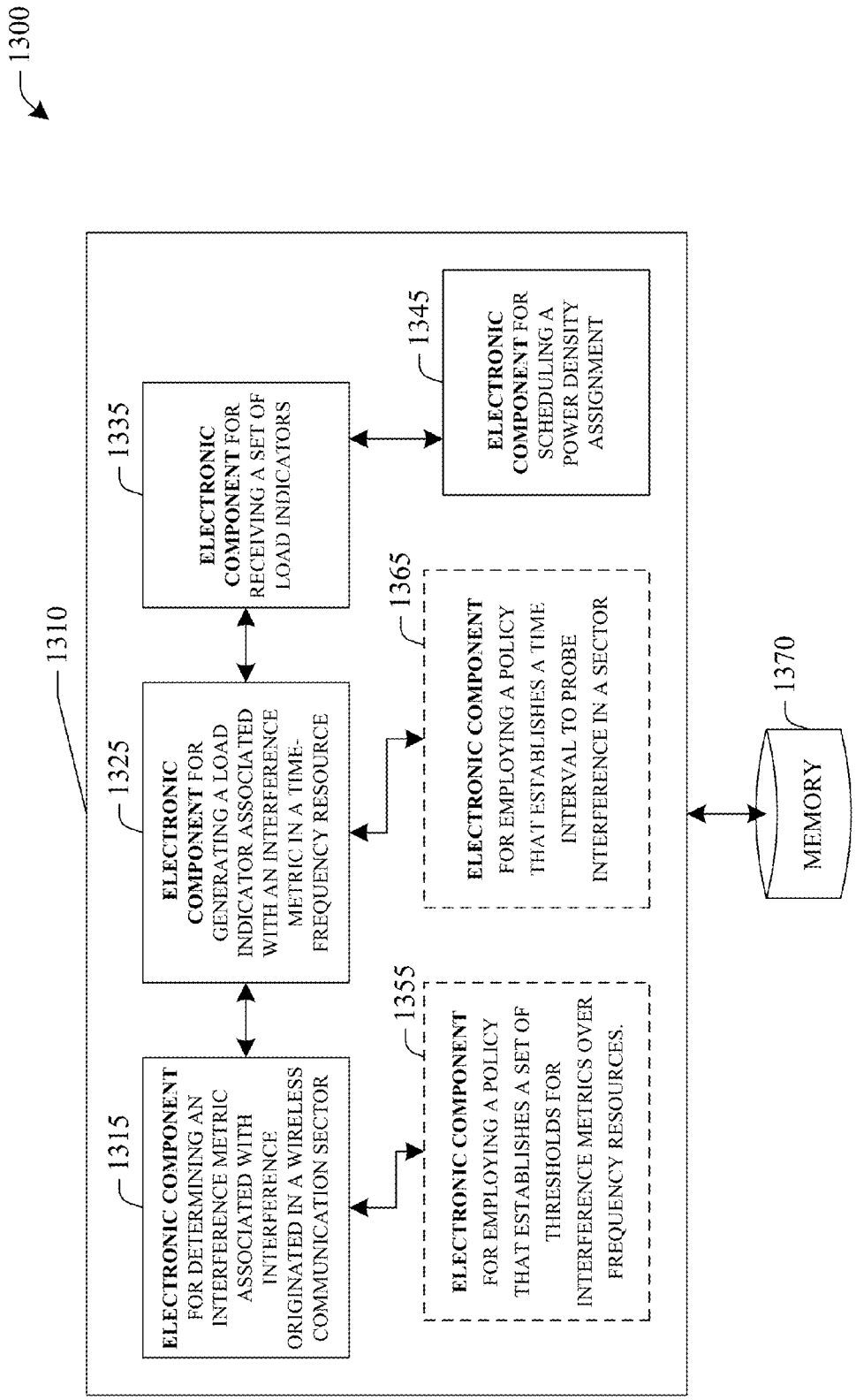
FIG. 13 illustrates a block diagram of an example system that enables generation of load indicators in a wireless communication in accordance with aspects of the subject disclosure.

FIG. 13 illustrates a block diagram of an example system that enables generation of load indicators in a wireless communication in accordance with aspects of the subject disclosure. System 1300 can reside, at least partially, within a wireless base station (e.g., access point $230_1$-$230_N$, or 260). System 1300 includes a logical grouping 1310 of electronic components that can act in conjunction. In an aspect, logical grouping 1310 includes an electronic component 1315 for determining an interference metric associated with interference originated in a wireless communication sector; an electronic component 1325 for generating a load indicator associated with an interference metric in a time-frequency resource; an electronic component 1335 for receiving a set of load indicators, and an electronic component 1345 for scheduling a power density assignment. In addition, system 1300 can include electronic component 1355, directly coupled to electronic component 1315, for employing a policy that establishes a time interval to probe interference in a sector, and electronic component 1365, directly coupled to component 1325, for employing a policy that establishes a set of thresholds for interference metrics over frequency resources.

System 1300 can also include a memory 1370 that retains instructions for executing functions associated with electrical components 1315, 1325, 1335, 1345, 1355, and 1365, as well as measured and computed data that may be generated during executing such functions. While shown as being external to memory 1370, it is to be understood that one or more of electronic components 1315, 1325, and 1335, 1345, 1355, and 1365 can exist within memory 1370.

Figure 14:
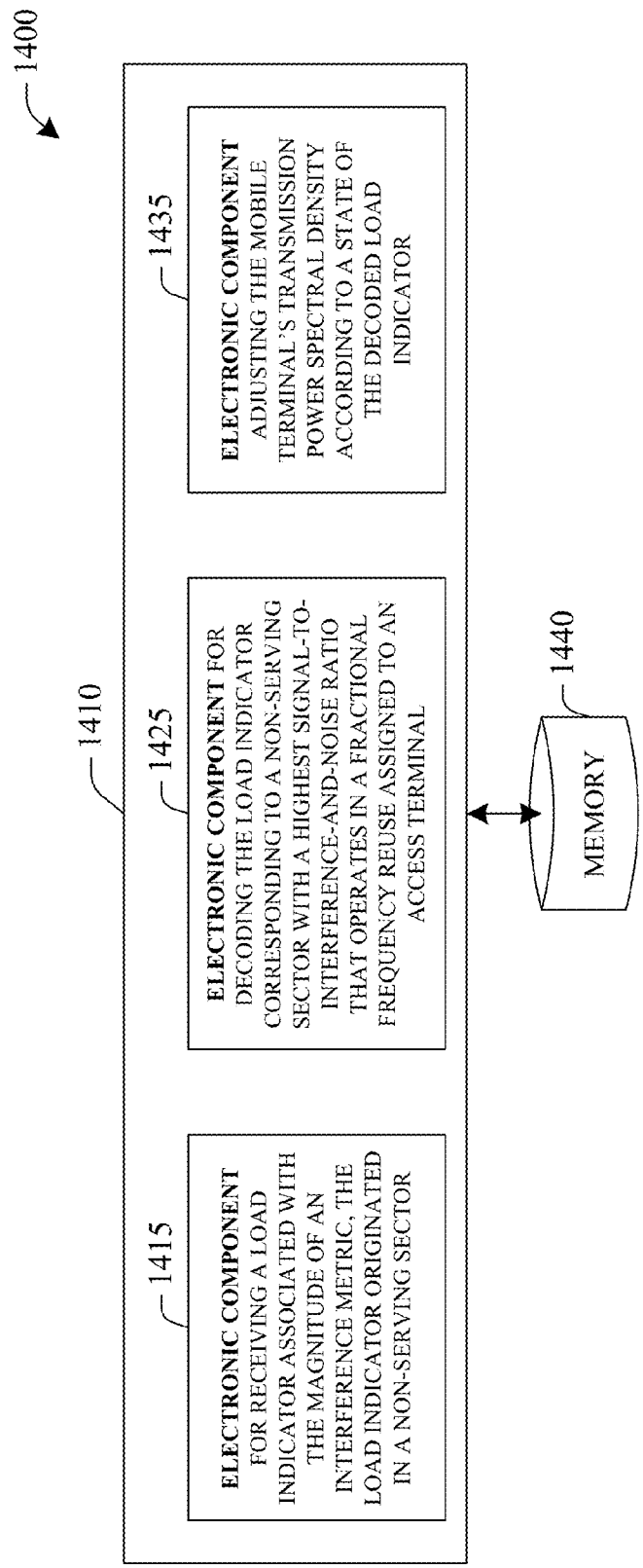
FIG. 14 illustrates a block diagram of an example system that enables receiving and decoding load indicators, as well as adjusting a transmission power in accordance with aspects of the subject disclosure.

FIG. 14 illustrates a block diagram of an example system that enables receiving and decoding load indicators, as well as adjusting a transmission power in accordance with aspects of the subject disclosure. System 1400 can reside, at least partially, within a wireless base station (e.g., access terminal 210). System 1400 includes a logical grouping 1410 of electronic components that can act in conjunction. In an aspect, logical grouping 1410 includes an electronic component 1415 for receiving a load indicator associated with the magnitude of an interference metric, the load indicator originated in a non-serving sector; an electronic component 1425 for decoding the load indicator corresponding to a non-serving sector with a highest signal-to-interference-and-noise ratio that operates in a fractional frequency reuse assigned to an access terminal; and an electronic component 1435 for adjusting the mobile terminal's transmission power spectral density according to a state of the decoded load indicator.

System 1400 can also include a memory 1440 that retains instructions for executing functions associated with electronic components 1415, 1425, and 1435, as well as measured and computed data that may be generated during executing such functions. While shown as being external to memory 1340, it is to be understood that one or more of electronic components 1415, 1425, and 1435 can exist within memory 1440.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates power control in a wireless communication system, the method comprising:
   receiving, at a mobile terminal, a fractional frequency reuse (FFR) pattern of each sector of a set of sectors;
   receiving a plurality of load indicators originated in the set of sectors;
   identifying at least one non-serving sector of the set of sectors that operates in frequency bands assigned to the mobile terminal based on the received FFR pattern of the at least one non-serving sector;
   decoding a load indicator of the plurality of received load indicators that corresponds to a non-serving sector of the at least one non-serving sector with a highest signal-to-interference-and-noise ratio; and
   adjusting a transmission power of the mobile terminal according to a state of the decoded load indicator.

2. The method of claim 1, wherein the frequency bands assigned to the mobile terminal are dictated by a received fractional frequency reuse pattern of the mobile terminal.

3. The method of claim 1, wherein a state of the decoded load indicator is true when said indicator reflects an interference metric satisfies a threshold, and false otherwise.

4. The method of claim 3, wherein the threshold is an average of a set of thresholds associated with the frequency bands assigned to the mobile terminal.

5. The method of claim 4, wherein the average is at least one of an arithmetic average, a harmonic average, or a geometric average.

6. The method of claim 4, wherein the set of thresholds associated with the frequency bands assigned to the mobile terminal is time dependent.

7. The method of claim 4, wherein the set of thresholds associated with the frequency bands assigned to the mobile terminal is established through a policy.

8. The method of claim 7, wherein the policy is determined by the non-serving sector and is sector specific.

9. The method of claim 3, wherein adjusting the transmission power of the mobile terminal according to the state of the decoded load indicator includes decreasing the transmission power when the state is true.

10. The method of claim 3, wherein adjusting the transmission power of the mobile terminal according to the state of the decoded load indicator includes increasing the transmission power when the state is false.

11. The method of claim 9, wherein decreasing the transmission power comprises decrementing a current transmission power by a predetermined offset value $\Delta P_0$.

12. The method of claim 9, wherein decreasing the transmission power comprises decrementing a current transmission power by a power adjustment offset $\Delta P(I)$ that depends at least on an interference metric value I associated with the decoded load indicator.

13. The method of claim 12, wherein $\Delta P(I)$ is inferred based at least on specific applications executed by the mobile terminal, the applications including at least one of wireless on-line banking or internet browsing or searching.

14. The method of claim 13, wherein $\Delta P(I)$ is inferred based at least on specific data transmitted by the mobile terminal.

15. The method of claim 1, wherein adjusting the transmission power of the mobile terminal according to the state of the decoded load indicator includes employing a closed control loop.

16. A mobile terminal, comprising:
   at least one processor configured to:
      receive a fractional frequency reuse (FFR) pattern of each sector of a set of sectors,
      receive a plurality of load indicators originated in the set of sectors,
      identify that the FFR pattern of at least one non-serving sector of the set of sectors is shared with an FFR pattern of the mobile terminal,
      decode a load indicator of the plurality of received load indicators that corresponds to a non-serving sector of the at least one non-serving sector with a highest signal-to-interference-and-noise ratio, and
      decrease the transmission power of the mobile terminal when a value of the decoded load indicator indicates an interference metric in the non-serving sector has satisfied a threshold; and
   a memory coupled to the at least one processor.

17. The mobile terminal of claim 16, wherein the at least one processor is further configured to increase the transmission power of the mobile terminal when a value of the decoded load indicator indicates an interference metric in the non-serving sector fails to satisfy a threshold.

18. The mobile terminal of claim 16, wherein to decrease the transmission power of the mobile terminal, the at least one processor is further configured to reduce a current transmission power by an offset value $\Delta P(I)$ that depends on the magnitude of the interference metric in the non-serving sector.

19. The mobile terminal of claim 17, wherein to increase the transmission power of the mobile terminal, the at least one processor is further configured to increment a current transmission power by a predetermined offset value $\Delta P_0$.

20. The mobile terminal of claim 16, wherein to receive the plurality of load indicators originated in the set of sectors, the at least one processor is further configured to receive a load indicator from a non-serving sector that operates in frequency bands assigned to the mobile terminal.

21. The mobile terminal of claim 16, wherein the at least one processor is further configured to receive a transmission power assignment from a serving sector in order to adjust transmission power in accordance to a load indicator state.

22. An apparatus that operates in a wireless communication environment, the apparatus comprising:
   means for receiving a fractional frequency reuse (FFR) pattern of each sector of a set of sectors;
   means for receiving a plurality of load indicators associated with the magnitude of an interference metric, the load indicators originated in the set of sectors;
   means for identifying at least one non-serving sector of the set of sectors that operates in an FFR assigned to a mobile terminal based on the received FFR pattern of the non-serving sector;
   means for decoding a load indicator of the plurality of received load indicators that corresponds to a non-serving sector of the at least one non-serving sector with a highest signal-to-interference-and-noise ratio; and
   means for adjusting a transmission power spectral density of the mobile terminal according to a state of the decoded load indicator.

23. A non-transitory computer-readable storage medium comprising:
   code for causing at least one computer to:
      receive a fractional frequency reuse (FFR) pattern of each sector of a set of sectors;
      receive a plurality of load indicators originated in the set of sectors;

identify at least one non-serving sector of the set of sectors that operates in frequency bands assigned to a mobile terminal based on the received FFR pattern of the at least one non-serving sector;

decode a load indicator of the plurality of received load indicators that corresponds to a non-serving sector of the at least one non-serving sector with a highest signal-to-interference-and-noise ratio; and adjust a transmission power of the mobile terminal according to a value of the decoded load indicator.

* * * * *